United States Patent
Flaig

(10) Patent No.: US 12,429,652 B2
(45) Date of Patent: Sep. 30, 2025

(54) MULTI-FIBER SEMI-PERMANENT SPLICING SYSTEMS

(71) Applicant: CommScope Technologies LLC, Hickory, NC (US)

(72) Inventor: Robert Charles Flaig, Lancaster, PA (US)

(73) Assignee: COMMSCOPE TECHNOLOGIES LLC, Claremont, NC (US)

(*) Notice: Subject to any disclaimer, the term of this patent is extended or adjusted under 35 U.S.C. 154(b) by 299 days.

(21) Appl. No.: 18/043,460

(22) PCT Filed: Aug. 23, 2021

(86) PCT No.: PCT/US2021/047133
§ 371 (c)(1),
(2) Date: Feb. 28, 2023

(87) PCT Pub. No.: WO2022/046624
PCT Pub. Date: Mar. 3, 2022

(65) Prior Publication Data
US 2023/0314722 A1 Oct. 5, 2023

Related U.S. Application Data

(60) Provisional application No. 63/071,804, filed on Aug. 28, 2020.

(51) Int. Cl.
G02B 6/38 (2006.01)
(52) U.S. Cl.
CPC ......... *G02B 6/3809* (2013.01); *G02B 6/3806* (2013.01)

(58) Field of Classification Search
CPC ....... G02B 6/38; G02B 6/3809; G02B 6/3806
See application file for complete search history.

(56) References Cited

U.S. PATENT DOCUMENTS 6,250,817 B1 6/2001 Lampert et al.
6,491,442 B1* 12/2002 Murakami ............ G02B 6/389
385/59

(Continued)

FOREIGN PATENT DOCUMENTS

WO 2016043922 A1 3/2016
WO 2016100384 A1 6/2016

(Continued)

OTHER PUBLICATIONS

International Search Report for PCT/0S2021/047133 mailed Dec. 29, 2021.

*Primary Examiner* — Tina Wong
(74) *Attorney, Agent, or Firm* — MERCHANT & GOULD P.C.

(57) ABSTRACT

The present disclosure relates generally to a bare-fiber connection system that includes first and second multi-fiber fiber optic connectors mounted in a multi-fiber adapter. The multi-fiber fiber optic connectors are bare-fiber connectors that each include a connector body and a plurality of optical fibers extending through the connector body. The bare-fiber connection system includes a latching arrangement for securing the first and second multi-fiber fiber optic connectors respectively in first and second adapter ports. The first and second multi-fiber fiber optic connectors and the multi-fiber adapter lack integrated structures for releasing the first and second multi-fiber fiber optic connectors from the first and second adapter ports.

10 Claims, 33 Drawing Sheets

(56) References Cited

U.S. PATENT DOCUMENTS

| | | | |
|---|---|---|---|
| 9,575,272 B2 | 2/2017 | Ptt | |
| 2002/0081084 A1 | 6/2002 | Matsumoto et al. | |
| 2013/0170797 A1* | 7/2013 | Ott | G02B 6/3885 385/60 |
| 2015/0355414 A1* | 12/2015 | Chen | G02B 6/3825 385/76 |
| 2015/0378113 A1* | 12/2015 | Good | G02B 6/3883 385/71 |
| 2018/0329155 A1 | 11/2018 | Verheyden | |
| 2019/0324215 A1* | 10/2019 | Wong | G02B 6/387 |
| 2020/0018904 A1 | 1/2020 | Kadar-Kallen et al. | |
| 2020/0225422 A1 | 7/2020 | Van Baelen et al. | |

FOREIGN PATENT DOCUMENTS

| | | | |
|---|---|---|---|
| WO | 2017081306 A1 | 5/2017 | |
| WO | 2020046709 A1 | 3/2020 | |
| WO | 2020079326 A1 | 4/2020 | |
| WO | 2020112645 A1 | 6/2020 | |
| WO | 2021163063 A1 | 8/2021 | |

* cited by examiner

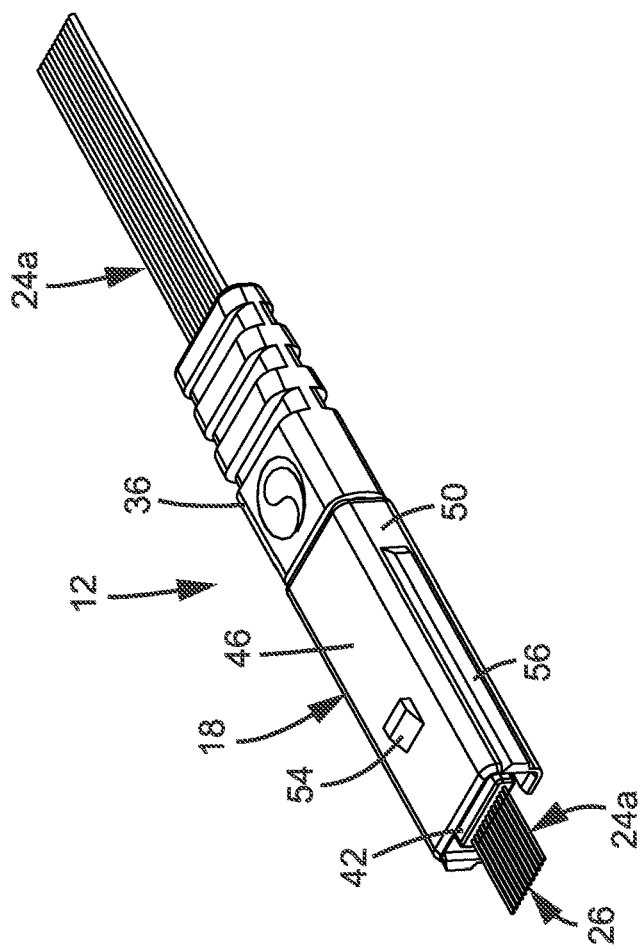
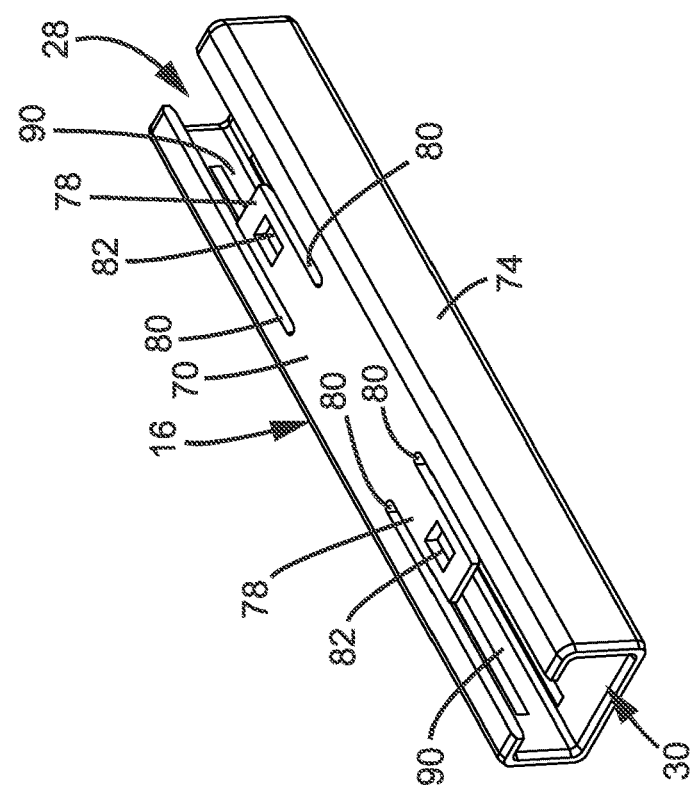
FIG. 6

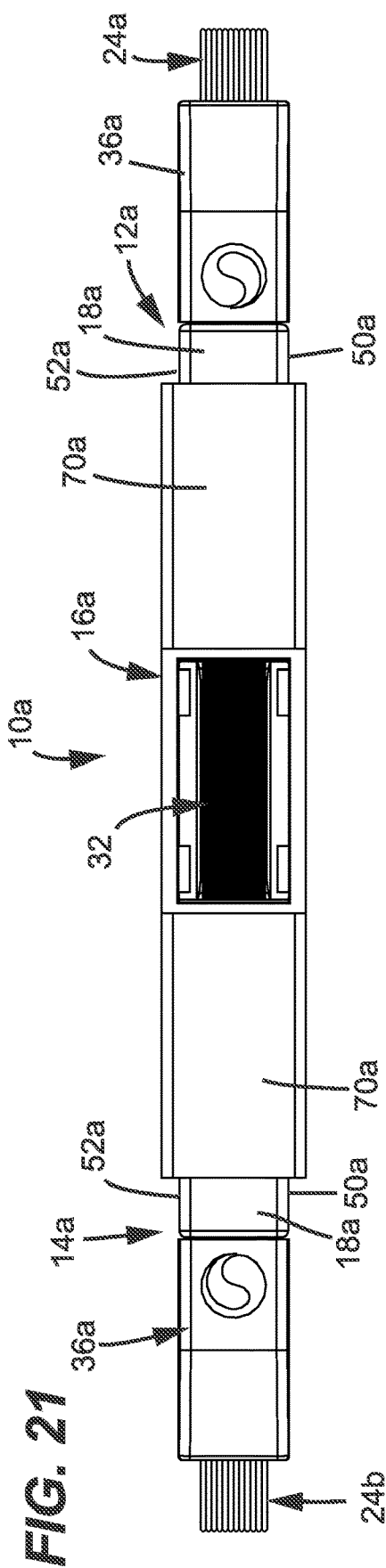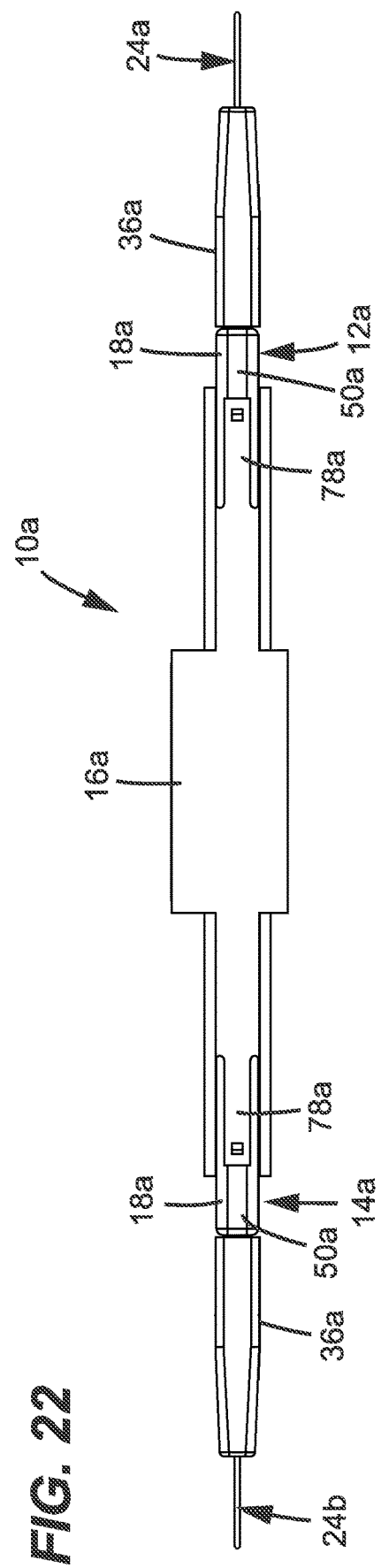

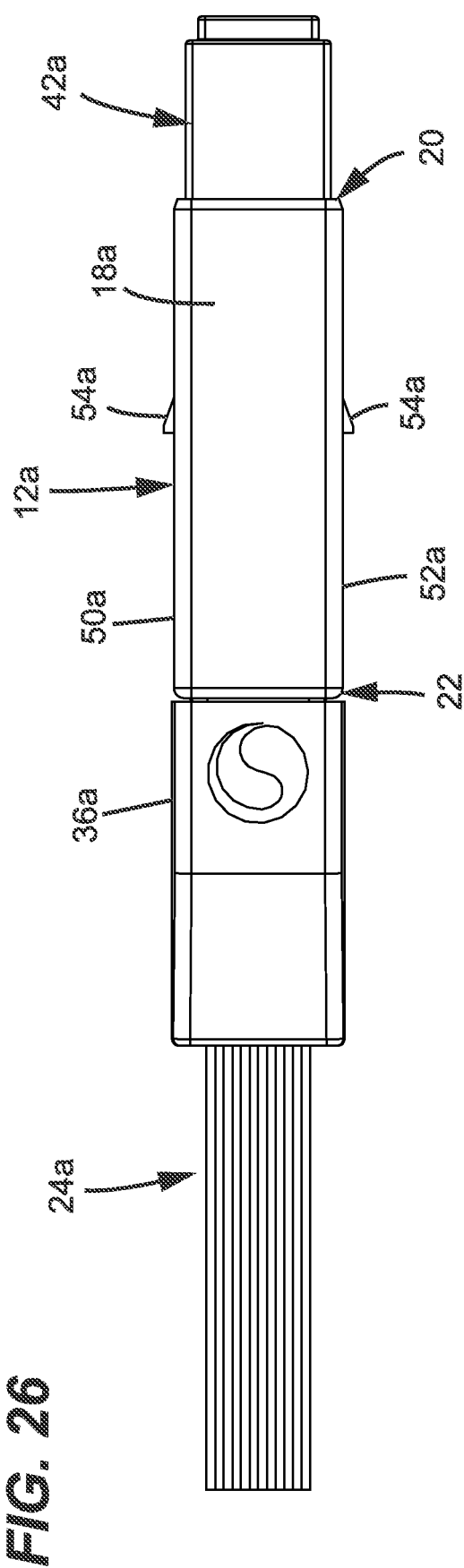

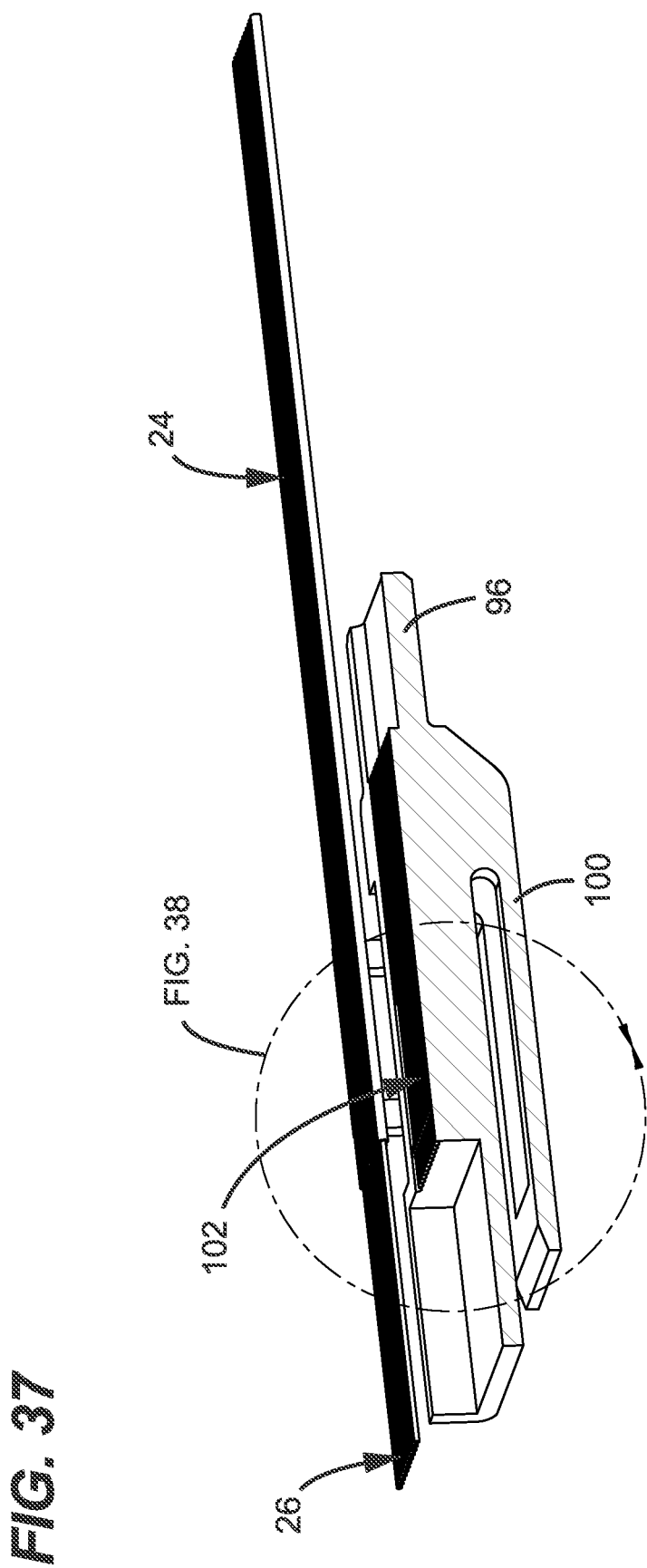

MULTI-FIBER SEMI-PERMANENT SPLICING SYSTEMS

CROSS-REFERENCE TO RELATED APPLICATIONS

This application is being filed as a National Stage Application of PCT International Patent Application PCT/US2021/047133 filed on Aug. 23, 2021, and claims priority to U.S. Provisional Patent Application No. 63/071,804, filed Aug. 28, 2020, the disclosures of which are incorporated herein by reference in their entireties.

TECHNICAL FIELD

The present disclosure relates generally to multi-fiber connectivity. More particularly, the present disclosure relates to bare-fiber multi-fiber connection systems.

BACKGROUND

Fiber optic connectors are commonly used in optical fiber communication systems to effect demateable optical connections between waveguides such as optical fibers. A typical optical connection is made by co-axially aligning two optical fibers in end-to-end relation with end faces of the optical fibers opposing one another. To effect optical coupling and minimize Fresnel loss, it is typically preferred for "physical contact" to exist between the optical waveguides, which, in the case of optical connectors, is generally between the opposed end faces of the aligned optical fibers.

Traditionally optical connectors have employed "ferrules." Ferrules are well-known components, which each hold one or more optical fibers such that the end faces of the optical fibers are presented for optical coupling. For example, traditional single fiber optical connectors such as SC or LC connectors include cylindrical ferrules with optical fibers supported and precisely centered within the ferrules. A traditional multi-fiber optical connector such as an MPO connector can include a ferrule that supports a plurality of optical fibers in a row. In the case of MPO connectors, the ferrules of two fiber optic connectors desired to be coupled together have a mating male and female configuration (e.g., a pin and socket configuration) which aligns the ferrules and concurrently aligns the plurality of optical fibers supported by the ferrules.

Another type of fiber optic connector can be referred to as a ferrule-less fiber optic connector or bare-fiber connector. In a bare-fiber optic connector, an end portion of an optical fiber corresponding to the bare-fiber optic connector is not supported by a ferrule. Instead, the end portion of the optical fiber is a free end portion. Similar to the ferruled connectors described above, fiber optic adapters can be used to assist in optically coupling together two bare-fiber optic connectors. Fiber optical adapters for bare-fiber connectors can include internal fiber alignment devices configured to receive optical fibers of bare-fiber optic connectors desired to be optically coupled together and to align the fiber tips of the fiber optic connectors to enable the transfer of optical signals there between.

SUMMARY

The present disclosure relates generally to a low cost, multi-fiber, semi-permanent, mechanical splicing system. The multi-fiber, semi-permanent, mechanical splicing system includes a minimum number of parts to reduce the costs associated with manufacturing.

In certain examples, the multi-fiber, semi-permanent, mechanical splicing system includes a bare-fiber multi-fiber fiber optic connector. The bare-fiber multi-fiber fiber optic connector includes a connector body and a plurality of optical fibers that extend through the connector body.

In certain examples, the bare-fiber multi-fiber fiber optic connector can include a fiber anchoring chip that mounts within the connector body. The fiber anchoring chip defines a plurality of grooves for receiving the plurality of optical fibers. The plurality of optical fibers can be anchored within the plurality of grooves by an adhesive such as epoxy. In other examples, adhesive may be injected or otherwise positioned in the connector body to secure the optical fibers within the connector body without requiring a fiber anchoring chip or the chip itself may be formed by adhesive.

The multi-fiber, semi-permanent, mechanical splicing system may include a multi-fiber adapter that defines an adapter port for receiving the bare-fiber multi-fiber fiber optic connector.

The multi-fiber, semi-permanent, mechanical splicing system may also include a nose piece mounted on the connector body. The nose piece can be movable along a longitudinal axis between an extended position where fiber ends of the plurality of optical fibers are protected and a retracted position where the fiber ends of the plurality of optical fibers project forwardly beyond the nose piece.

In certain examples, the nose piece can be frictionally held in the retracted position when the bare-fiber multi-fiber fiber optic connector is removed from the adapter port. The nose piece can be manually moved from the retracted position to the extended position. In certain examples, the bare-fiber multi-fiber fiber optic connector does not include a spring or springs for automatically returning the nose piece to the extended position.

The multi-fiber, semi-permanent, mechanical splicing system may include a latching arrangement for securing the bare-fiber multi-fiber fiber optic connector in the adapter port. The bare-fiber multi-fiber fiber optic connector and the multi-fiber adapter lack integrated structures for releasing the bare-fiber multi-fiber fiber optic connector from the adapter port thus making a semi-permanent connection between the bare-fiber multi-fiber fiber optic connector and the multi-fiber adapter.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the appended drawings, wherein like numerals denote like elements.

FIG. 6 illustrates another perspective view of the bare-fiber connection system of FIG. 1 showing a single multi-fiber fiber optic connector exploded from the multi-fiber adapter.

FIG. 21 illustrates a top view of the bare-fiber connection system of FIG. 17.

FIG. 22 illustrates a side view of the bare-fiber connection system of FIG. 17.

FIG. 26 illustrates a top view of the multi-fiber fiber optic connector of FIG. 24.

FIG. 27 illustrates a side view of the multi-fiber fiber optic connector of FIG. 24.

FIG. 31 illustrates an exploded view of the multi-fiber connector of

FIG. 29.

FIG. 37 illustrates a cross-sectional view of one of the housing pieces of

FIG. 29.

DETAILED DESCRIPTION

Figure 1:
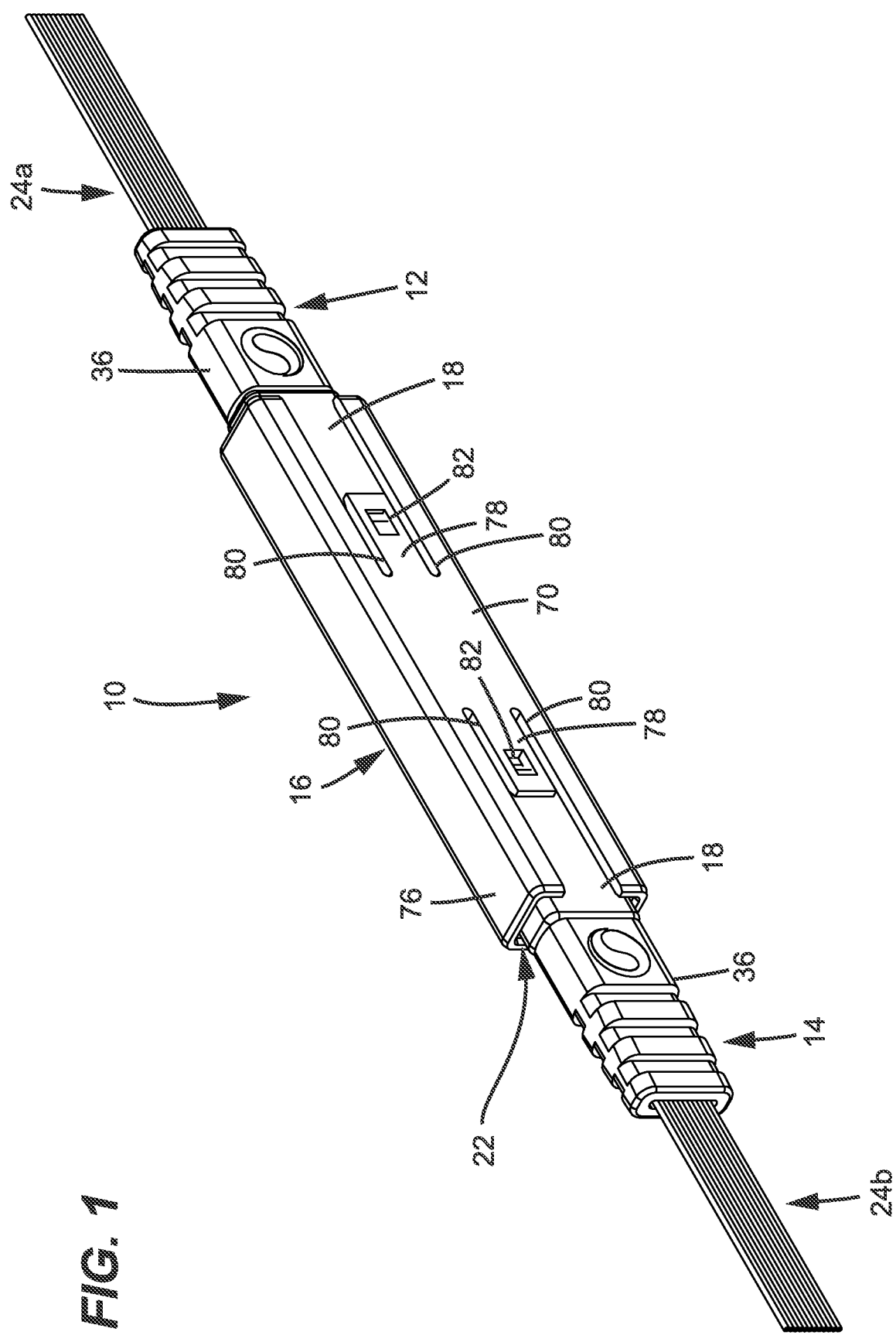
FIG. 1 illustrates a perspective view of a bare-fiber connection system including two multi-fiber fiber optic connectors mounted to a multi-fiber adapter, each of the multi-fiber fiber optic connectors having a plurality of optical fibers in accordance with principles of the present disclosure.
Figure 2:
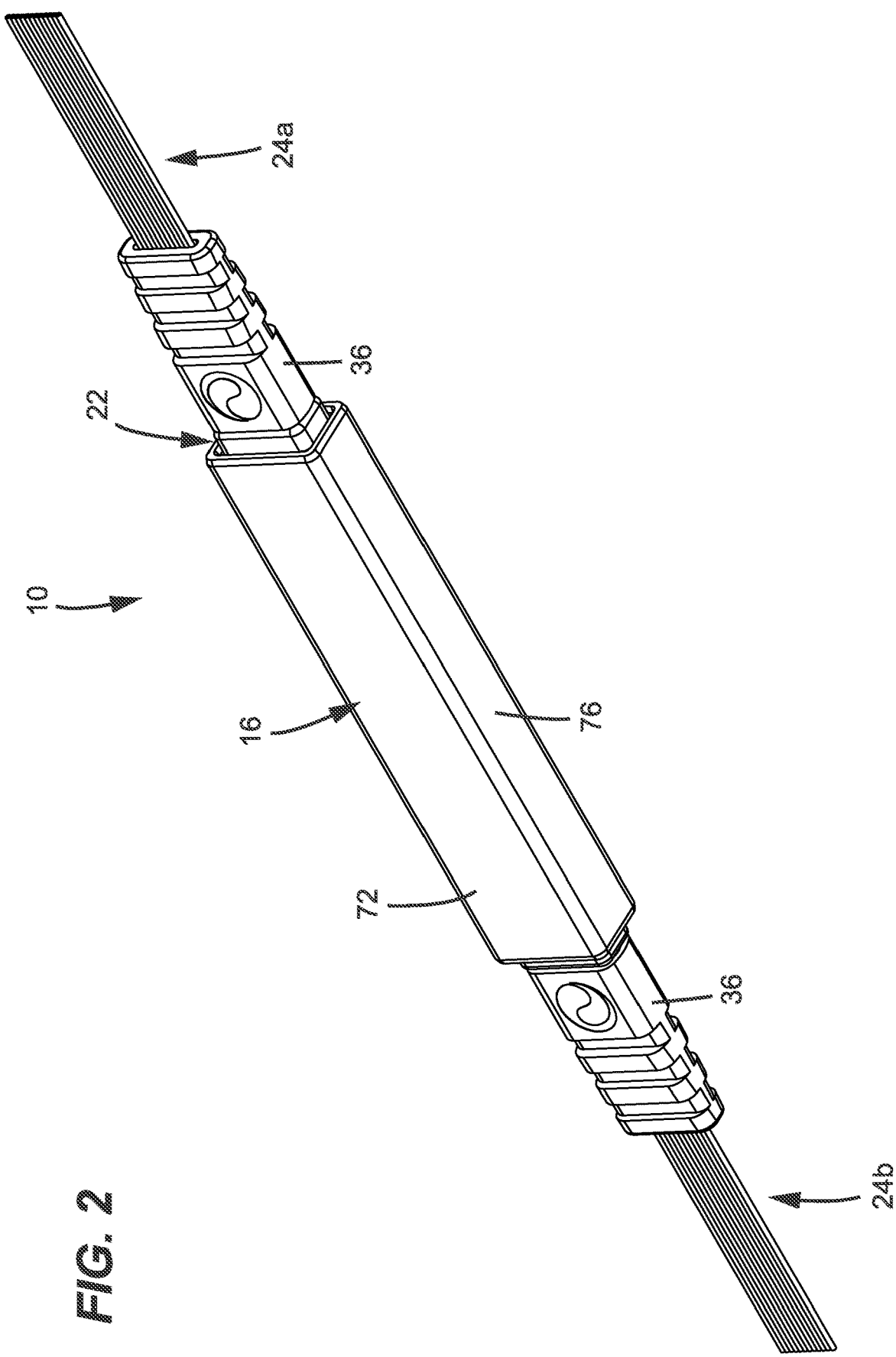
FIG. 2 illustrates a bottom perspective view of the bare-fiber connection system of FIG. 1.
Figure 3:
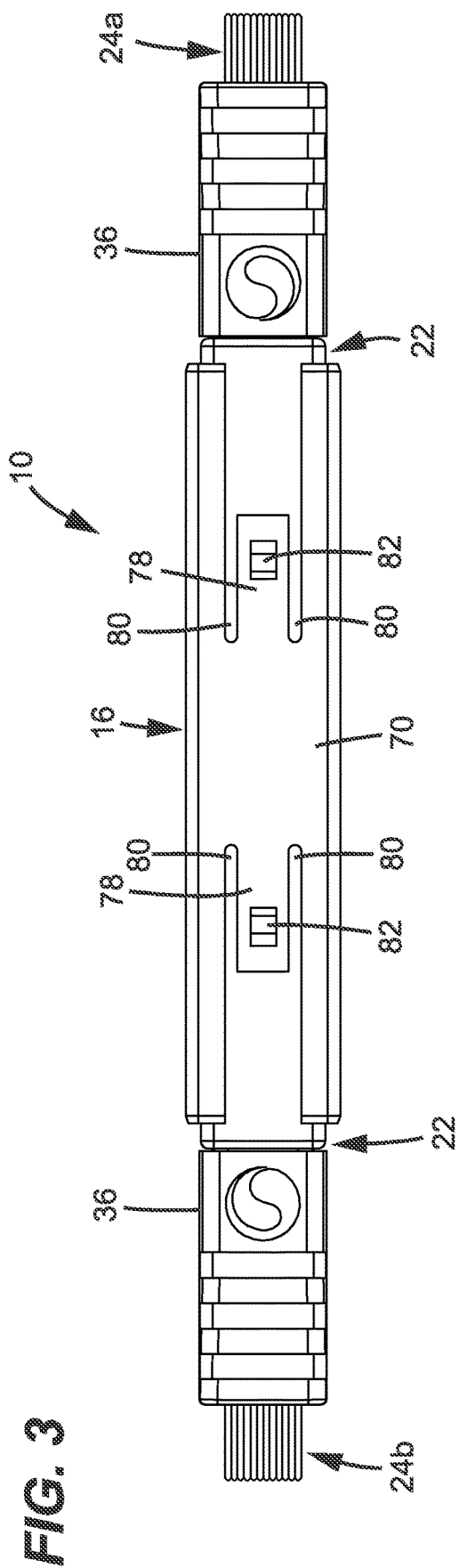
FIG. 3 illustrates a top view of the bare-fiber connection system of FIG. 1.
Figure 4:
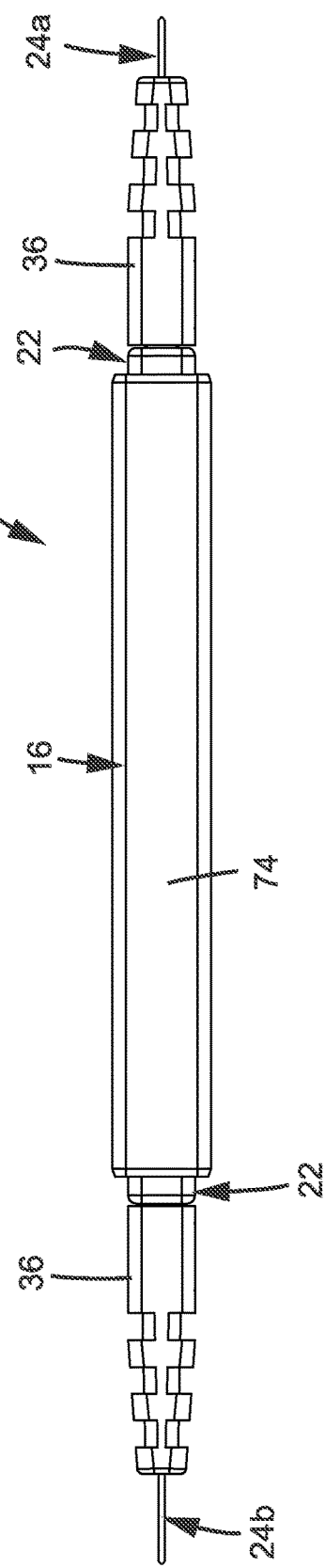
FIG. 4 illustrates a side view of bare-fiber connection system of FIG. 1.
Figure 5:
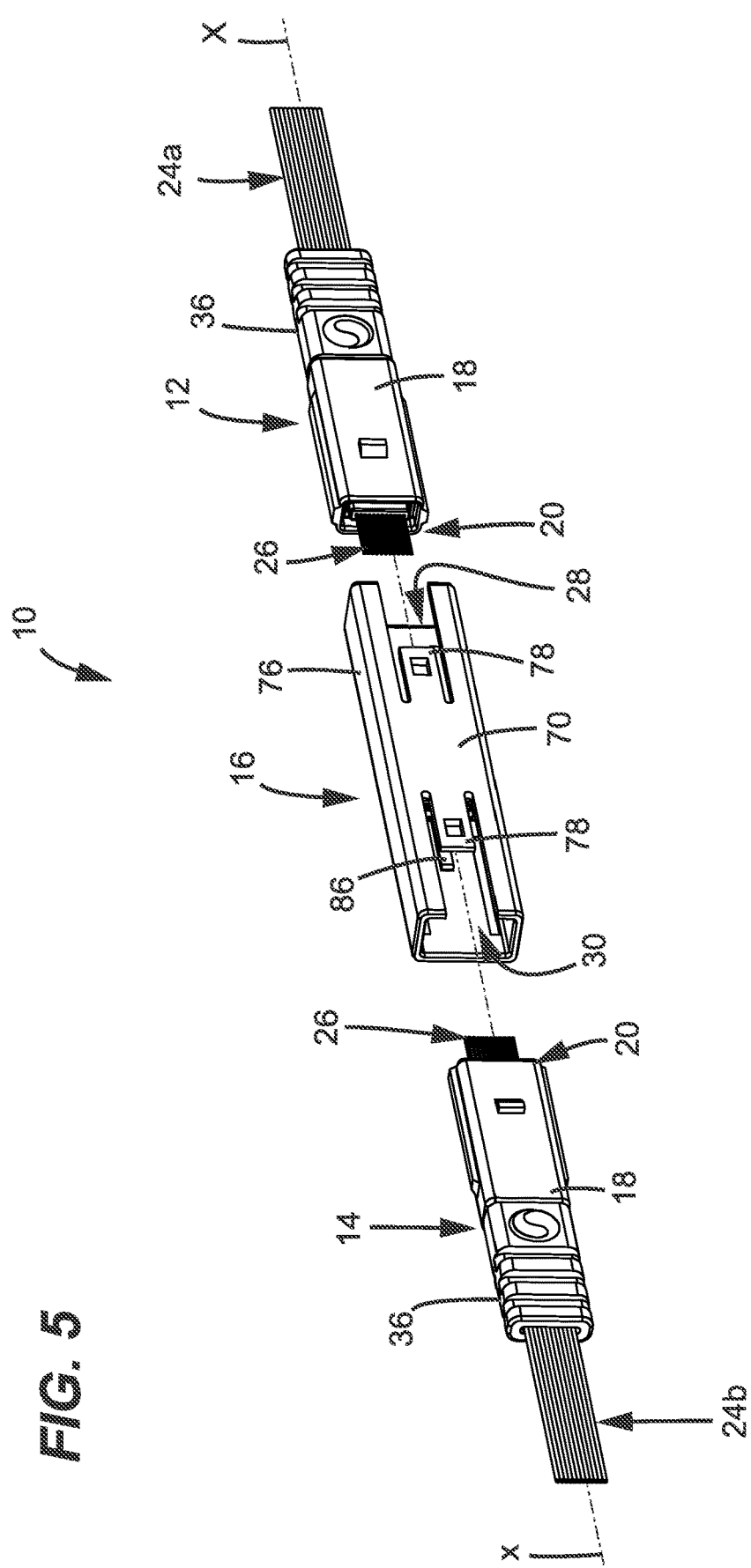
FIG. 5 illustrates a perspective view of the bare-fiber connection system of FIG. 1 showing the multi-fiber fiber optic connectors exploded from the multi-fiber adapter.
Figure 7:
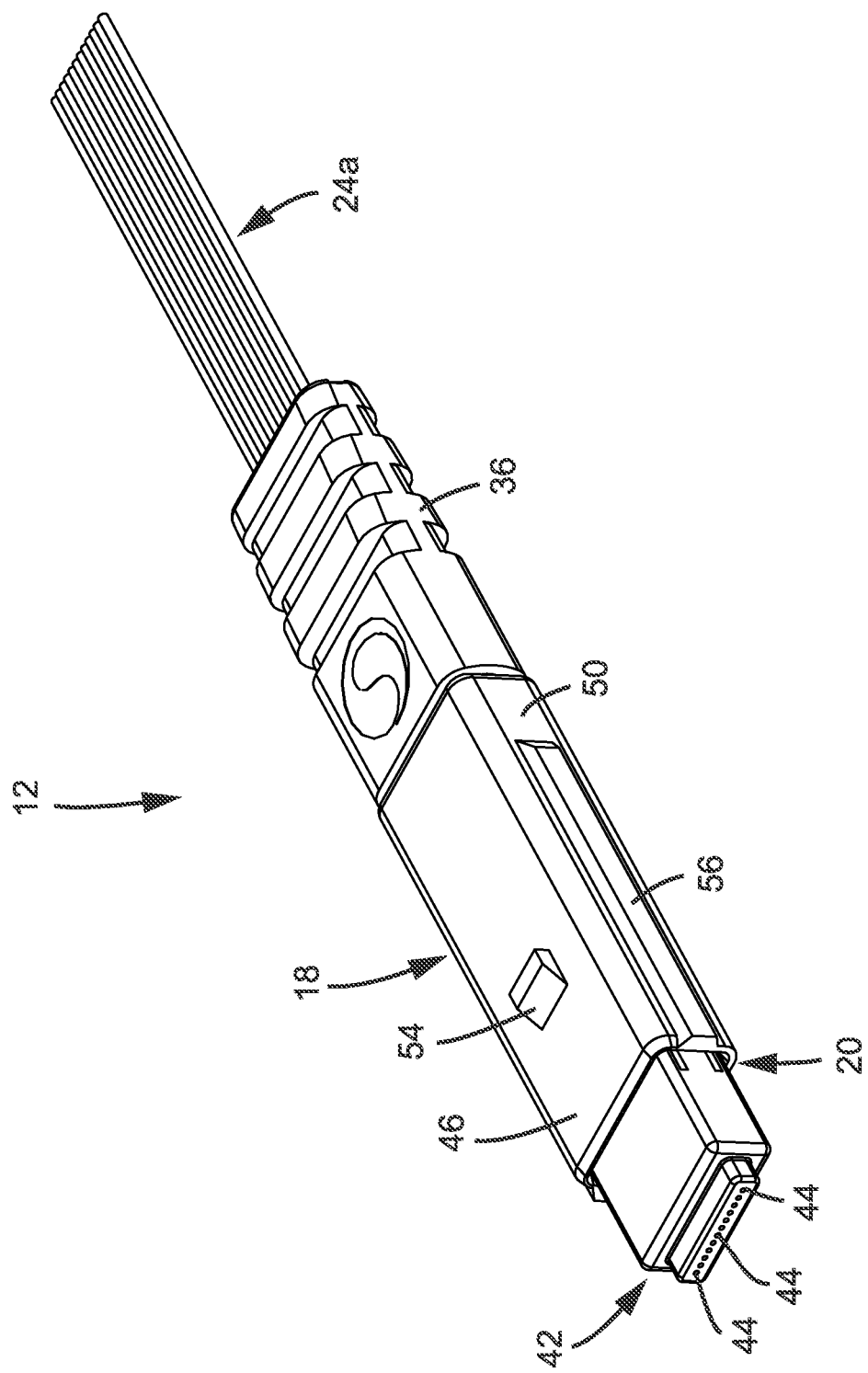
FIG. 7 illustrates a perspective view of the multi-fiber fiber optic connector of FIG. 6.
Figure 8:
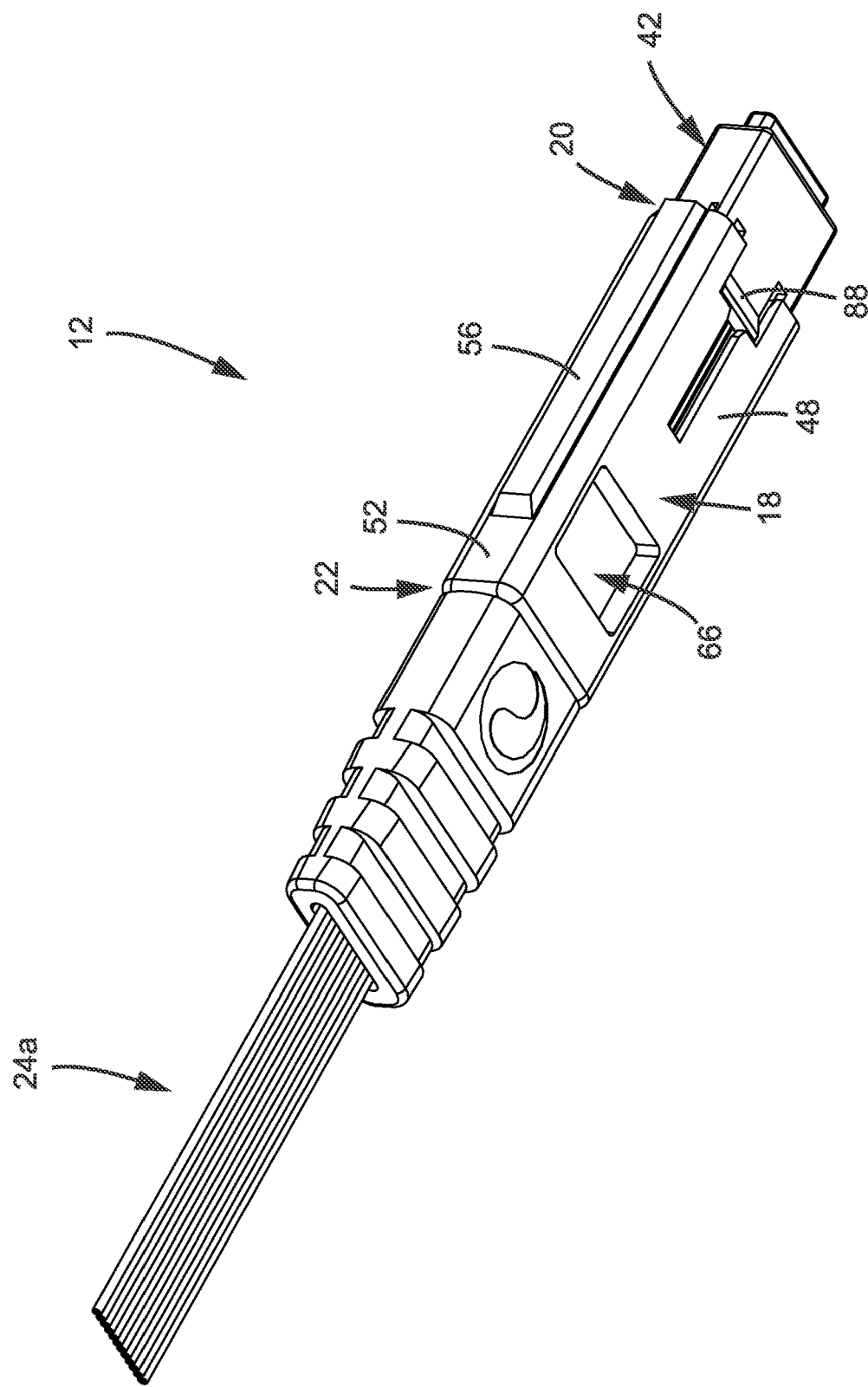
FIG. 8 illustrates a bottom perspective view of the multi-fiber fiber optic connector of FIG. 7.
Figure 9:
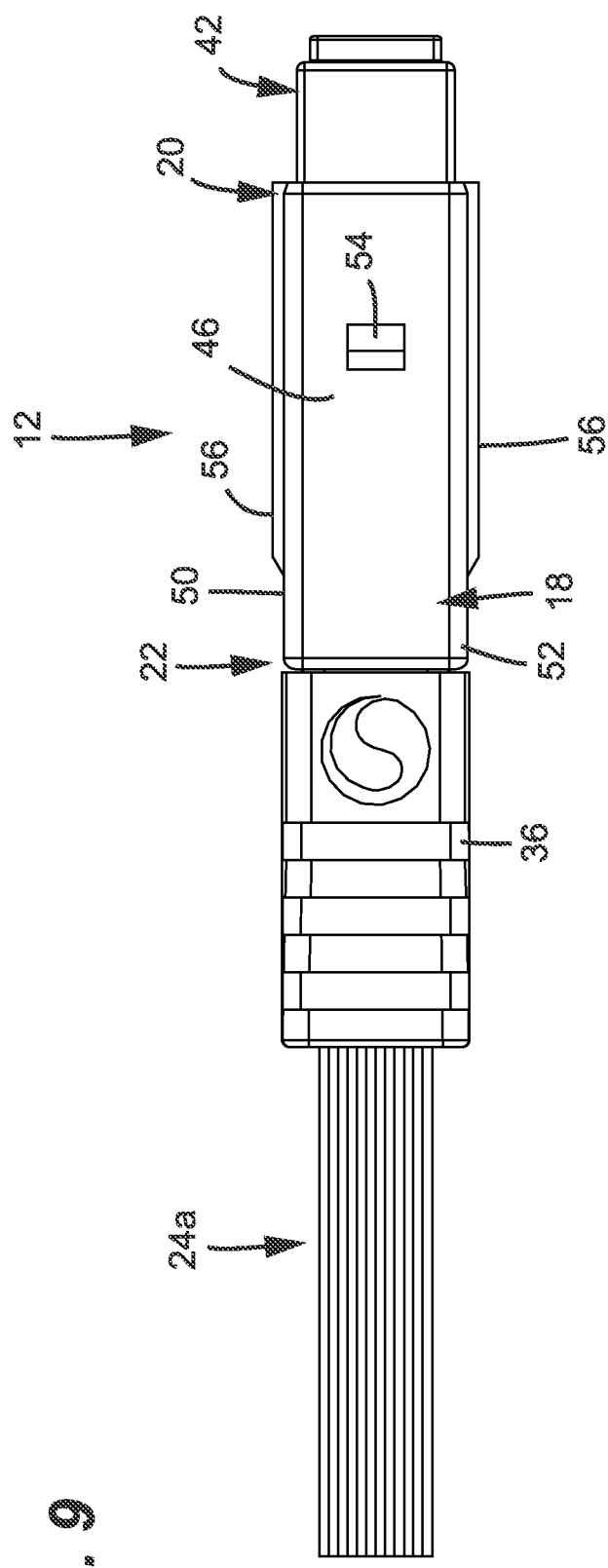
FIG. 9 illustrates a top view of the multi-fiber fiber optic connector of FIG. 7.
Figure 10:
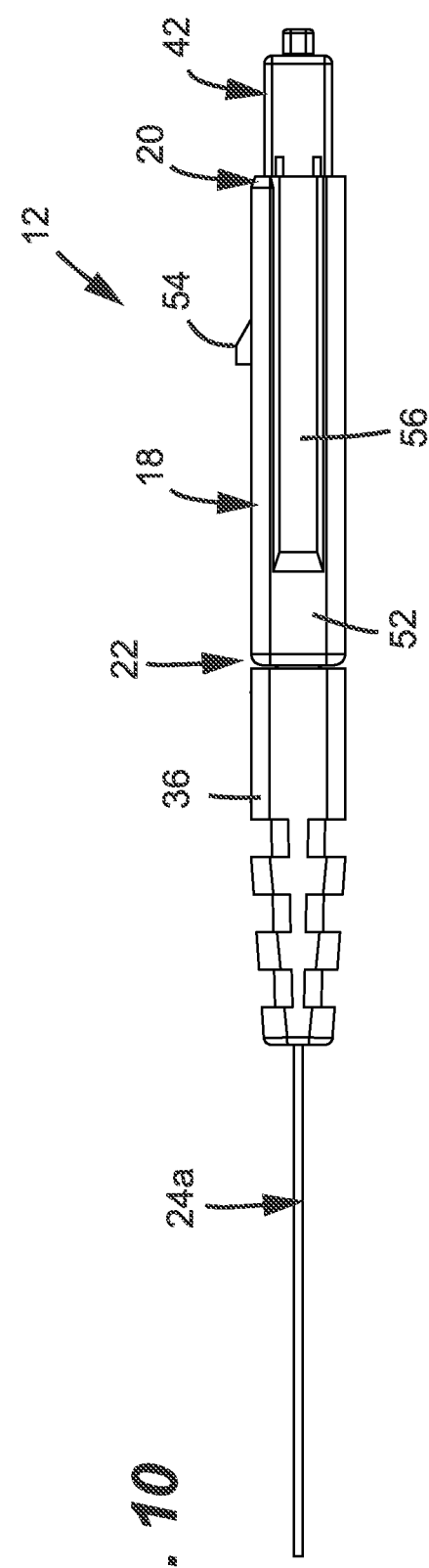
FIG. 10 illustrates a side view of the multi-fiber fiber optic connector of FIG. 7.
Figure 11:
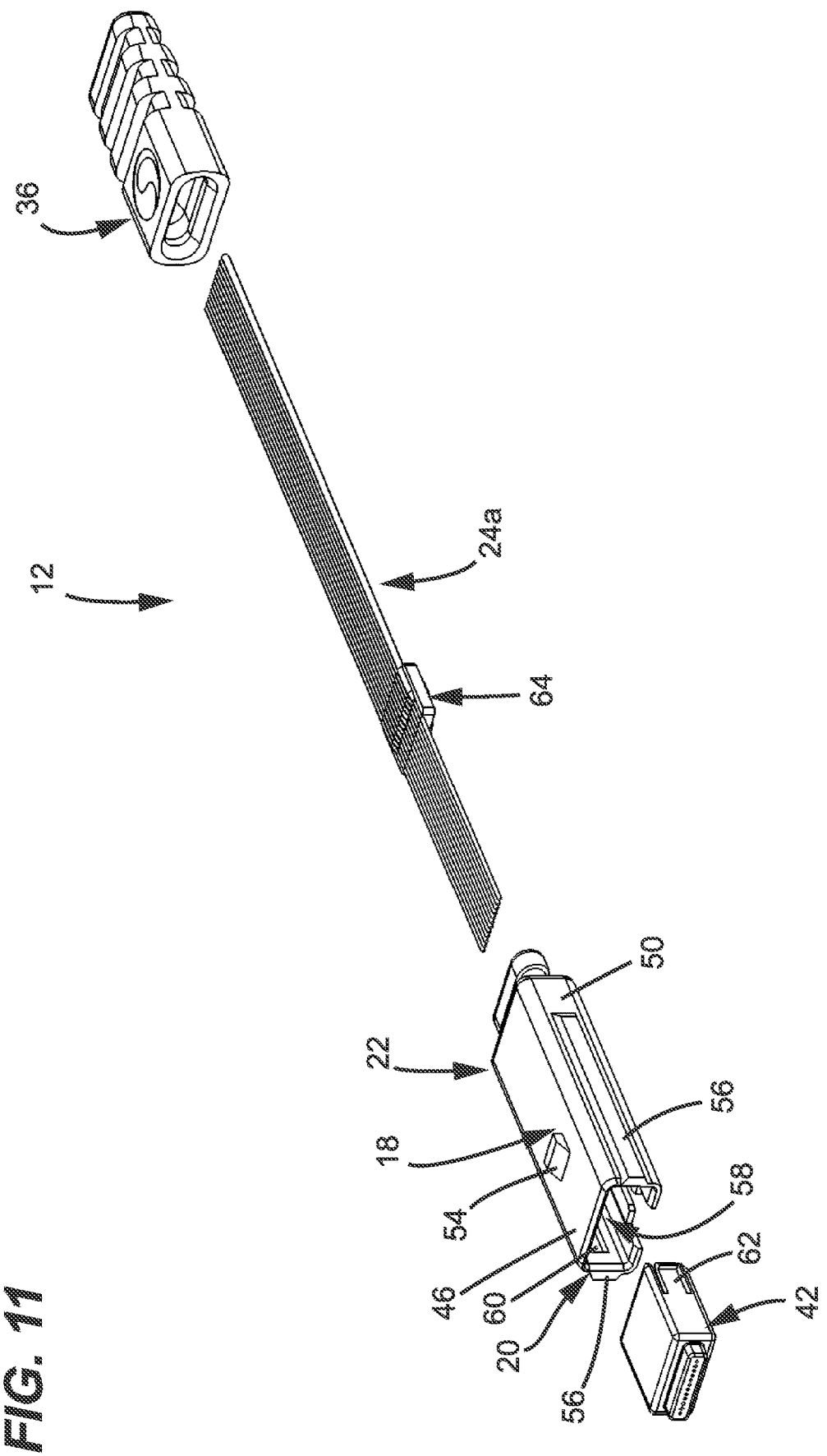
FIG. 11 illustrates an exploded view of the multi-fiber fiber optic connector of FIG. 7 showing a fiber anchoring chip, a boot, and a nose piece in accordance with the principles of the present disclosure.

Various embodiments of the present invention will be described in detail with reference to the drawings, wherein like reference numerals represent like parts and assemblies throughout the several views. Reference to various embodiments does not limit the scope of the invention. Additionally, any examples set forth in this specification are not intended to be limiting and merely set forth some of the many possible embodiments.

FIGS. 1-5 illustrate an example bare-fiber connection system 10 in accordance with the principles of the present disclosure. The bare-fiber connection system 10 includes a first multi-fiber fiber optic connector 12, a second multi-fiber fiber optic connector 14, and a multi-fiber adapter 16. In the depicted example, the first and second multi-fiber fiber optic connectors 12, 14 are bare-fiber multi-fiber fiber optic connectors.

The first and second multi-fiber fiber optic connectors 12, 14 each include a connector body 18 that has a front end 20 and a rear end 22. The connector body 18 defines a longitudinal axis X that extends through the connector body 18 in an orientation that extends from the front end 20 to the rear end 22 of the connector body 18.

The first multi-fiber fiber optic connector 12 includes a first plurality of optical fibers 24a that extend through the connector body 18 from the rear end 22 to the front end 20. The second multi-fiber fiber optic connector 14 includes a second plurality of optical fibers 24b that extend through the connector body 18 from the rear end 22 to the front end 20. The first and second plurality of optical fibers 24a, 24b have fiber ends 26 (e.g., end portions) that are respectively accessible at the front ends 20 of the connector bodies 18 of the first and second multi-fiber fiber optic connectors 12, 14. In certain examples, the first and second plurality of optical fibers 24a, 24b may be ribbonized, buffered, or otherwise contained within a passage of an outer jacket. In the example shown, there are twelve optical fibers 24. In certain examples, however, the first and second multi-fiber fiber optic connectors 12, 14 may include a greater or lesser number of optical fibers 24 (e.g., one fiber, two fibers, six fibers, eight fibers, twenty-four fibers, etc.).

The multi-fiber adapter 16 can be used to assist in optically coupling together the first and second multi-fiber fiber optic connectors 12, 14. The multi-fiber adapter 16 can include opposite first and second adapter ports 28, 30 for respectively receiving the first and second multi-fiber fiber optic connectors 12, 14 to couple the first and second multi-fiber fiber optic connectors 12, 14 together.

The multi-fiber adapter 16 includes a groove-defining piece 32 (e.g., internal bare fiber alignment piece)(see FIG. 13) positioned between the first and second adapter ports 28, 30. The groove-defining piece 32 defines multiple fiber alignment grooves 34 (see FIG. 14) for receiving and co-axially aligning the fiber ends 26 of the first and second plurality of optical fibers 24a, 24b such that optical signals can be conveyed between the first and second plurality of optical fibers 24a, 24b of the first and second multi-fiber fiber optic connectors 12, 14.

In certain examples, the first and second multi-fiber fiber optic connectors 12, 14 can each include a strain relief boot 36 that can be attached to the rear end 22 of the connector body 18 by snapping a lip 38 over a shoulder 40 and into a retention groove. The strain relief boot 36 can have a segmented configuration to enhance flexibility.

Turning to FIGS. 6-12, the first multi-fiber fiber optic connector 12 is depicted. The first and second multi-fiber optic connectors 12, 14 are identical. As such, only the first multi-fiber fiber optic connector 12 will be described in detail. It will be appreciated that the features described herein with reference to the first multi-fiber fiber optic connector 12 will also apply to the second multi-fiber fiber optic connector 14.

The first multi-fiber fiber optic connector 12 includes a nose piece 42 mounted at the front end 20 of the connector body 18 of the first multi-fiber fiber optic connector 12. The nose piece 42 defines a plurality of fiber passages 44 through which the plurality of optical fibers 24a extend. The plurality of fiber passages 44 can be v-grooves or other shaped grooves (e.g., half circles, U-shaped grooves, etc.). The nose piece 42 can be movable along the longitudinal axis X between an extended position (see FIG. 7) where the fiber ends 26 of the plurality of optical fibers 24a are protected within the plurality of fiber passages 44 and a retracted position (see FIG. 6) where the fiber ends 26 of the plurality of optical fibers 24a project forwardly beyond the nose piece 42.

The connector body 18 has a first major side 46 (e.g., top), an opposite, second major side 48 (e.g., bottom), a first minor side 50, and an opposite, second minor side 52. In certain examples, at least one of the first and second major sides 46, 48 of the connector body 18 includes a catch 54, although alternatives are possible. The first and second minor sides 50, 52 of the connector body 18 can each include a rail 56, although alternatives are possible.

It will be appreciated by those skilled in the art that in other examples, the first and second major sides 46, 48 of the connector body 18 can each include the catch 54. Also, in other examples, at least one of the first and second minor sides 50, 52 of the connector body 18 can include the rail 56.

The connector body 18 defines an opening 58 at the front end 20 for mounting the nose piece 42. Recesses 60 can be defined within the connector body 18 on the first and second minor sides 50, 52 thereof. In certain examples, the nose piece 42 can include latches 62 that engage the recesses 60 of the connector body 18 to be latched therein for retaining the nose piece 42 in the extended position. The latches 62 can help to prevent the nose piece 42 from becoming detached from the connector body 18.

The nose piece 42 can be frictionally held at the front end 20 of the connector body 18 because there is no spring. The nose piece 42 can be held in the retracted position when the first multi-fiber fiber optic connector 12 is removed from the first adapter port 28. The noise piece 42 is required to be manually moved from the retracted position to the extended position. That is, the first multi-fiber fiber optic connector 12 does not include a spring or springs for automatically returning the nose piece 42 to the extended position. In other examples, a spring or spring may be provided, but for cost and sizing purposes it is preferred to not include a spring or springs for returning the nose piece 42 to the extended position.

In certain examples, the first multi-fiber fiber optic connector 12 can include a pre-formed structure, such as a fiber anchoring chip 64 (see FIG. 11), that cooperates with adhesive to bond the plurality of optical fibers 24a within the connector body 18. The plurality of optical fibers 24a can be inserted through the rear end 22 of the connector body 18, the fiber anchoring chip 64 can be mounted through the second major side 48 of the connector body 18 into a cavity 66 defined therein to anchor the plurality of optical fibers 24a.

In certain examples, the first multi-fiber fiber optic connector 12 can include a fiber retention structure that is all formed by adhesive. That is, rather than using the pre-formed fiber anchoring chip 64, a volume of adhesive can be injected or otherwise positioned within the cavity 66 for anchoring the optical fibers 24. In certain examples, the adhesive can conform to a shape of an interior fiber locking/anchoring region of the connector body.

Figure 12:
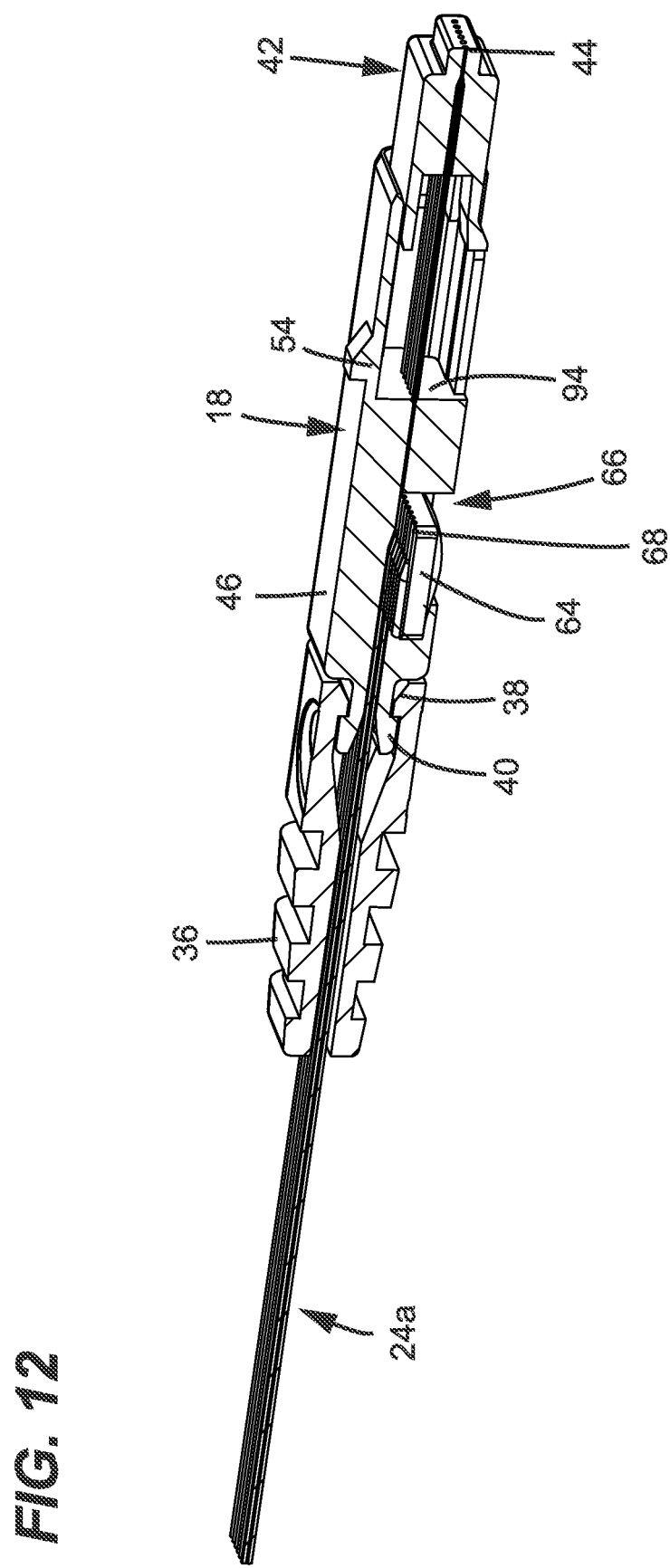
FIG. 12 illustrates a cross-sectional perspective view of the multi-fiber fiber optic connector of FIG. 7.

Still referring to FIG. 12, the fiber anchoring chip 64 defines a plurality of grooves 68 for receiving the plurality of optical fibers 24a when the fiber anchoring chip 64 is pushed into the cavity 66 of the connector body 18. Epoxy can be used in combination with the anchoring chip 64 to anchor the plurality of optical fibers 24a within the plurality of grooves 68 of the fiber anchoring chip 64. By bonding the plurality of optical fibers 24a, the plurality of optical fibers 24a can be held in an aligned position. In certain examples, the plurality of grooves 68 of the fiber anchoring chip 64 can be V-shaped grooves and/or U-shaped grooves, although alternatives are possible.

Turning again to FIG. 6, the multi-fiber adapter 16 includes a first major adapter side 70 (e.g., top), an opposite, second major adapter side 72 (e.g., bottom), a first minor adapter side 74, and an opposite, second minor adapter side 76. In certain examples, latches 78 can be defined by slots 80 provided on at least one of the first and second major adapter sides 70, 72 of the multi-fiber adapter 16, although alternatives are possible. In certain examples, the latches 78 can be provided on the first and second minor adapter sides 74, 76 of the multi-fiber adapter 16, although alternatives are possible. In certain examples, the latches 78 can be provided on at least one of the first and second minor adapter sides 74, 76 of the multi-fiber adapter 16.

The latches 78 of the multi-fiber adapter 16 can each define an aperture 82 that engages the catch 54 of the first and second multi-fiber fiber optic connectors 12, 14 as part of a latching arrangement 84 (see FIG. 13) to allow the first and second multi-fiber fiber optic connectors 12, 14 to be secured (e.g. interlocked) within mating first and second adapter ports 28, 30, respectively.

The first and second multi-fiber fiber optic connectors 12, 14 and the multi-fiber adapter 16 lack integrated structures for releasing the first and second multi-fiber fiber optic connectors 12, 14 from the first and second adapter ports 28, 30. Thus, a semi-permanent connection can be provided between the first and second multi-fiber fiber optic connectors 12, 14 and the multi-fiber adapter 16.

As used herein the term "semi-permanent" is intended to mean the multi-fiber fiber optic connectors do not have any release mechanism on them and the multi-fiber adapter does not have any release mechanism on it. Therefore, when the multi-fiber fiber optic connectors are inserted into the multi-fiber adapter, the multi-fiber fiber optic connectors are latched therein such that the only way to release it is with a separate tool that is not on either the multi-fiber fiber optic connectors or the multi-fiber adapter.

Figure 13:
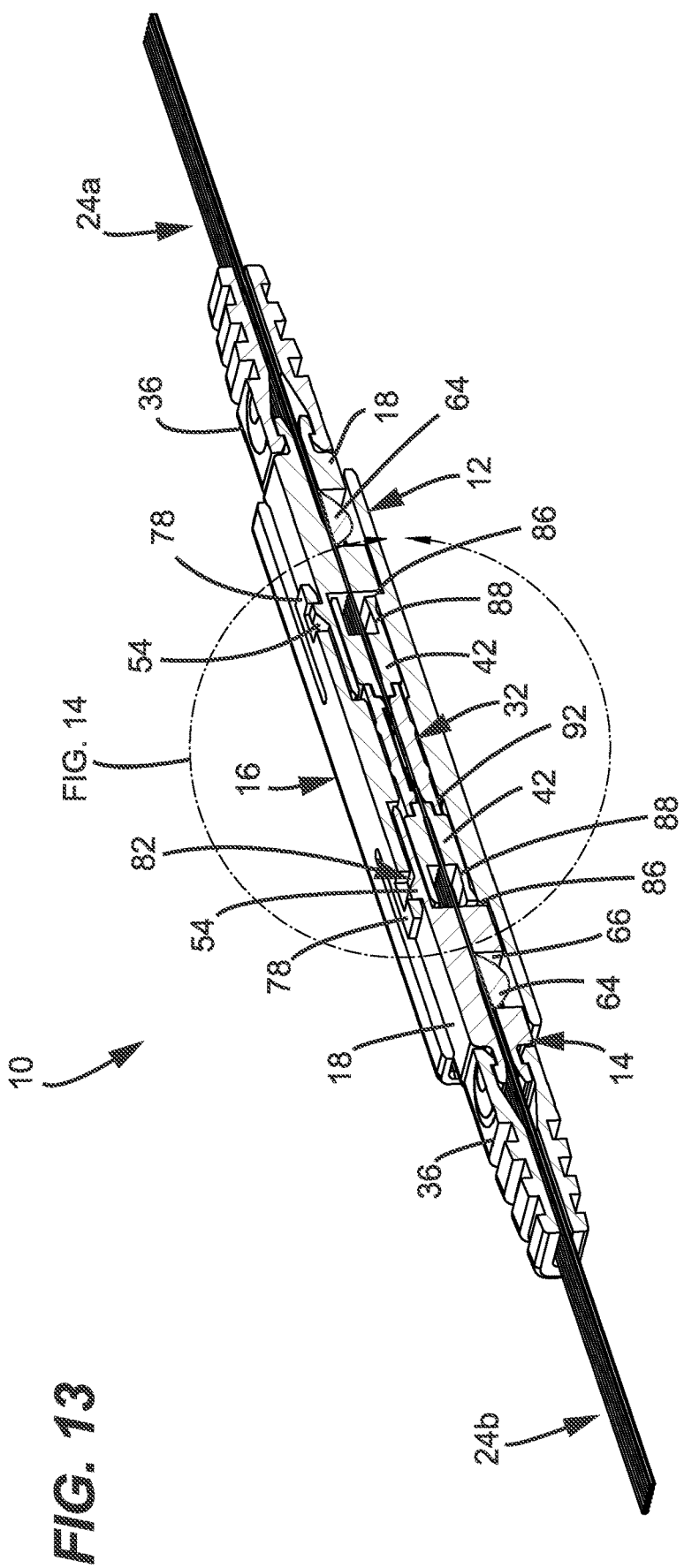
FIG. 13 illustrates a cross-sectional perspective view of the bare-fiber connection system of FIG. 1 showing a groove-defining piece of the multi-fiber adapter in accordance with the principles of the present disclosure.
Figure 14:
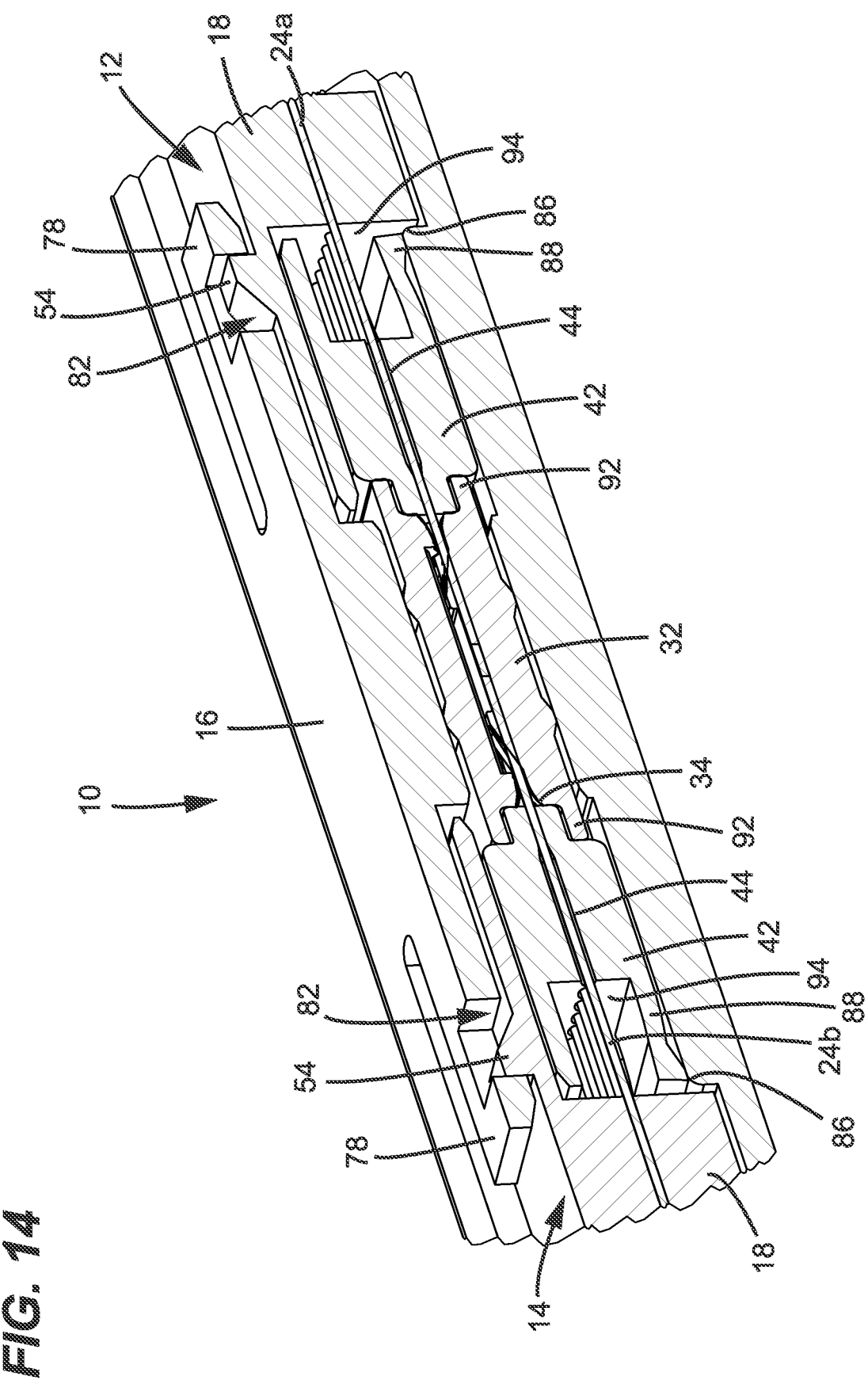
FIG. 14 illustrates an enlarged partial view of the bare-fiber connection system of FIG. 13.

Turning to FIGS. 13-14, the multi-fiber adapter 16 can include nose piece releases 86 that are configured to engage a latch member 88 of the nose piece 42 as the first multi-fiber fiber optic connector 12 is inserted into the first adapter port 28. The nose piece releases 86 can press the latch member 88 upward to unlatch the nose piece 42 from the connector body 18 as the first multi-fiber fiber optic connector 12 is inserted into the first adapter port 28 to allow the nose piece 42 to move from the extended position to the retracted position. The latch member 88 also prevents the nose piece 42 from being pushed back into the retracted position before the nose piece 42 is inserted into the multi-fiber adapter 16.

The first and second minor adapter sides 74, 76 can include guide channels 90 (see FIG. 6) within the first and second adapter ports 28, 30 that receive the rails 56 of the connector body 18 as the first multi-fiber fiber optic connector 12 is inserted into the first adapter port 28.

Figure 15:
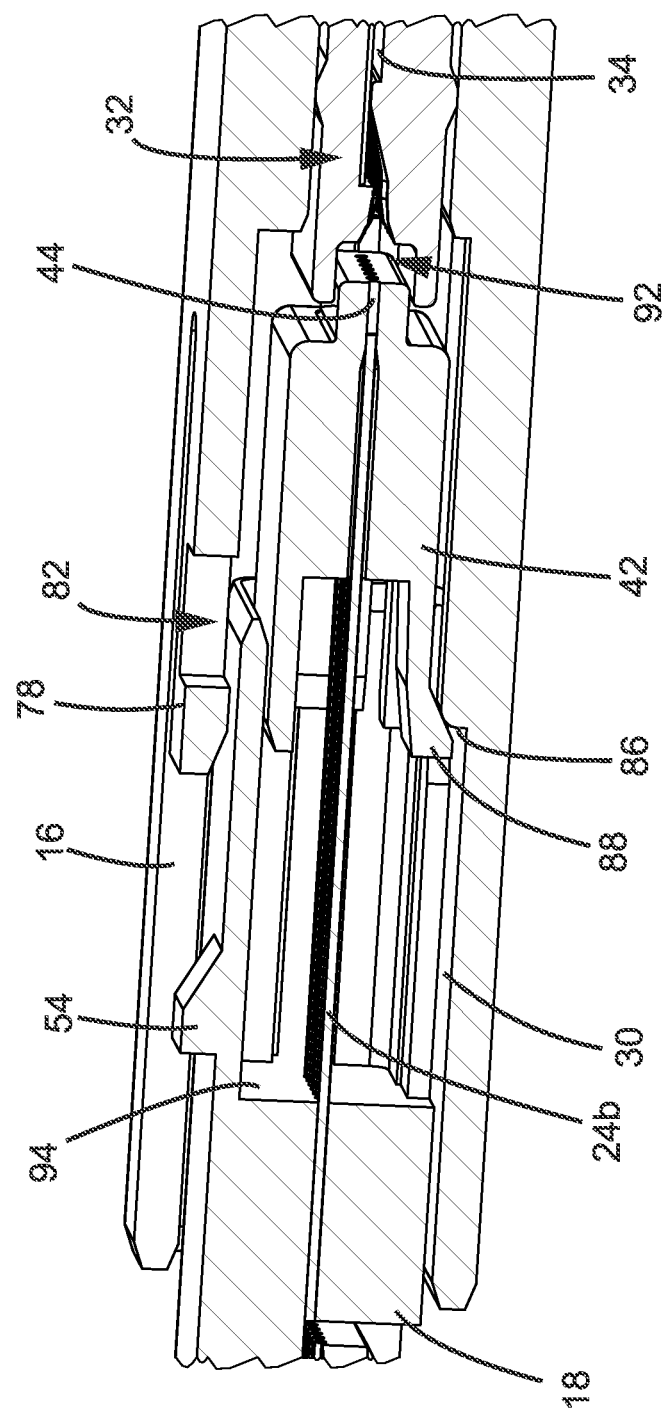
FIG. 15 illustrates a partial view of the bare-fiber connection system FIG. 14 before the multi-fiber fiber optic connector is fully inserted into the multi-fiber adapter.
Figure 16:
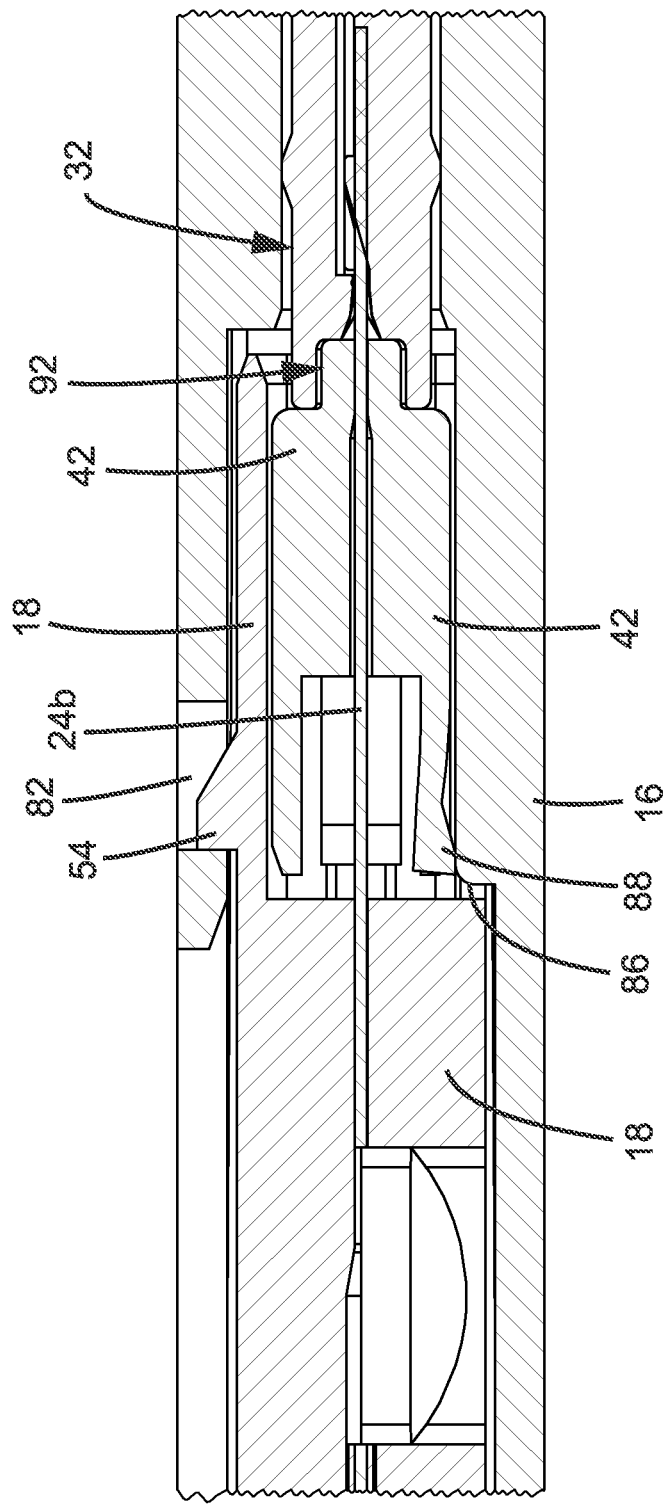
FIG. 16 illustrates the multi-fiber optic connector of FIG. 15 snapped into the multi-fiber adapter with the nose piece engaged with the groove-defining piece.
Figure 17:
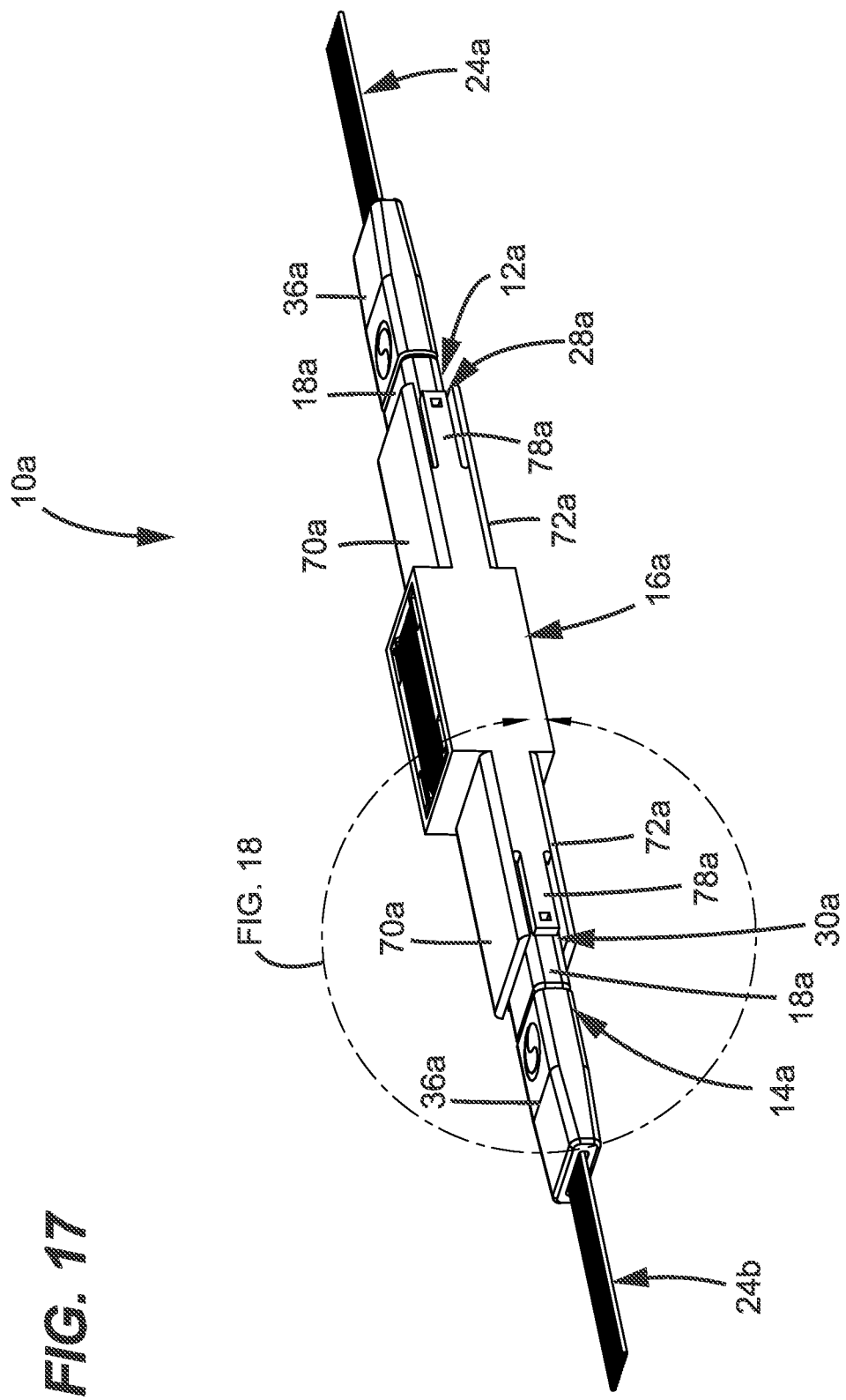
FIG. 17 illustrates a perspective view of an alternative bare-fiber connection system with a low profile construction of multi-fiber fiber optic connectors and adapter ports of a multi-fiber adapter in accordance with the principles of the present disclosure.
Figure 18:
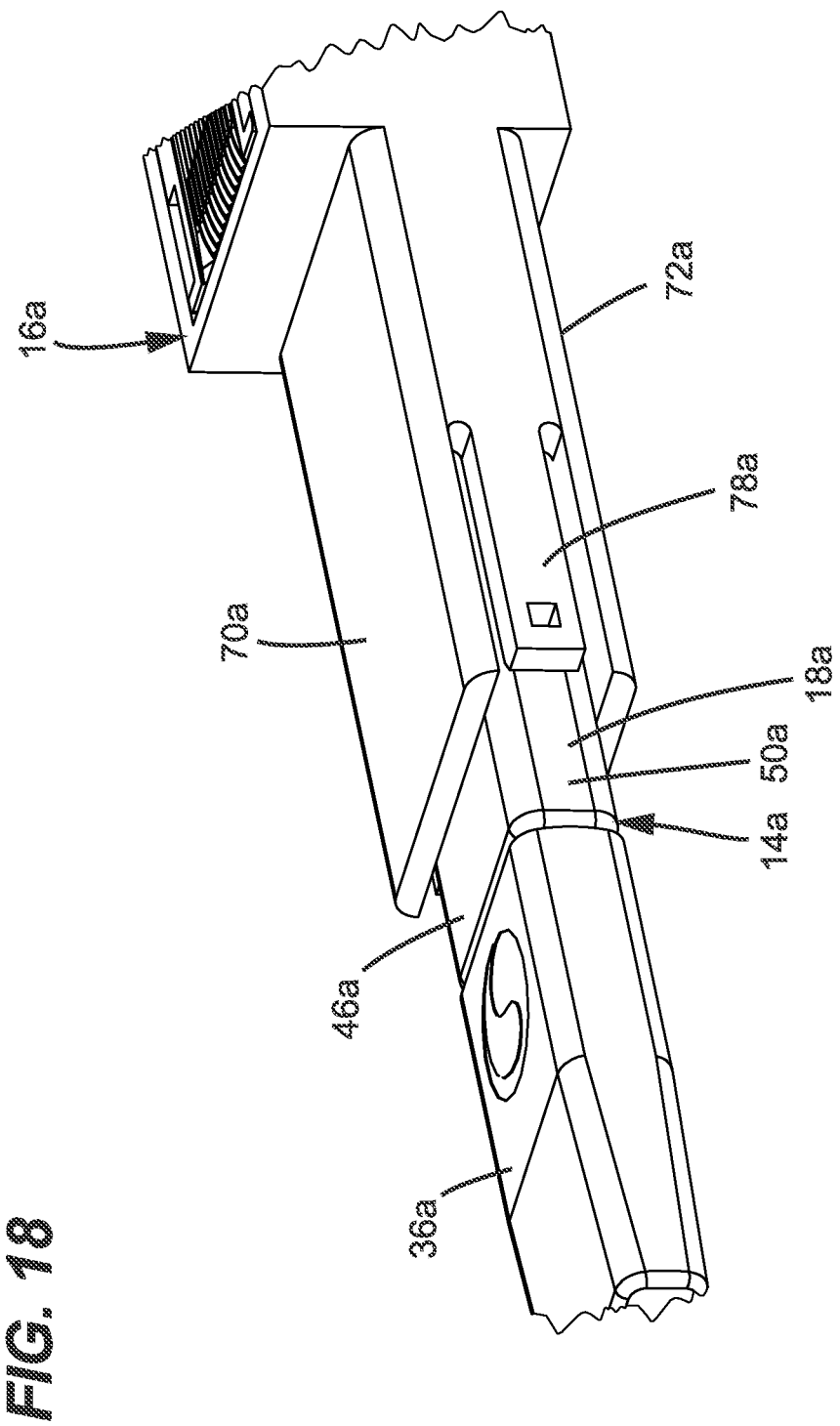
FIG. 18 illustrates an enlarged view of a portion of the bare-fiber connection system of FIG. 17.
Figure 19:
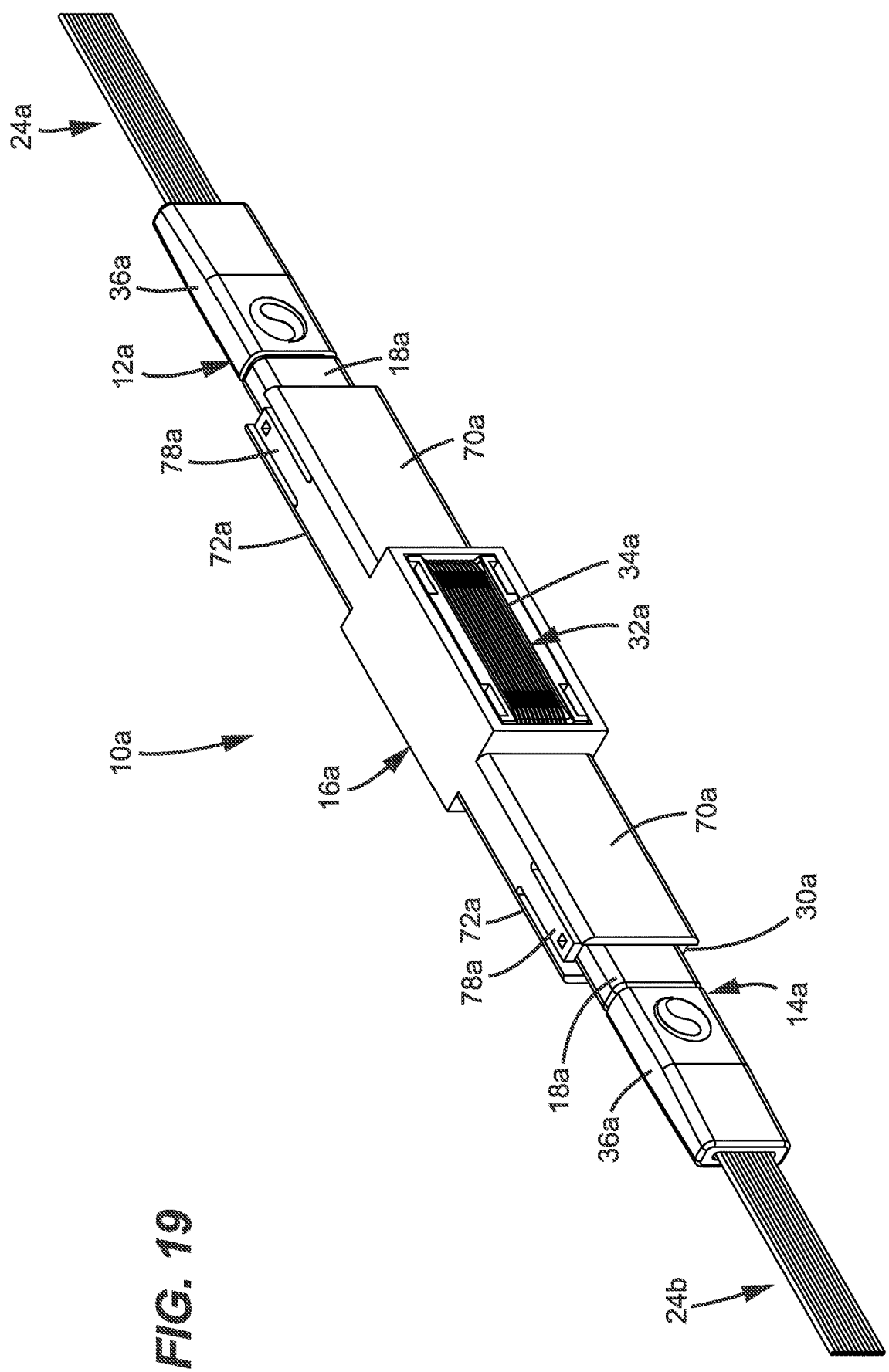
FIG. 19 illustrates another perspective view of the bare-fiber connection system of FIG. 17.
Figure 20:
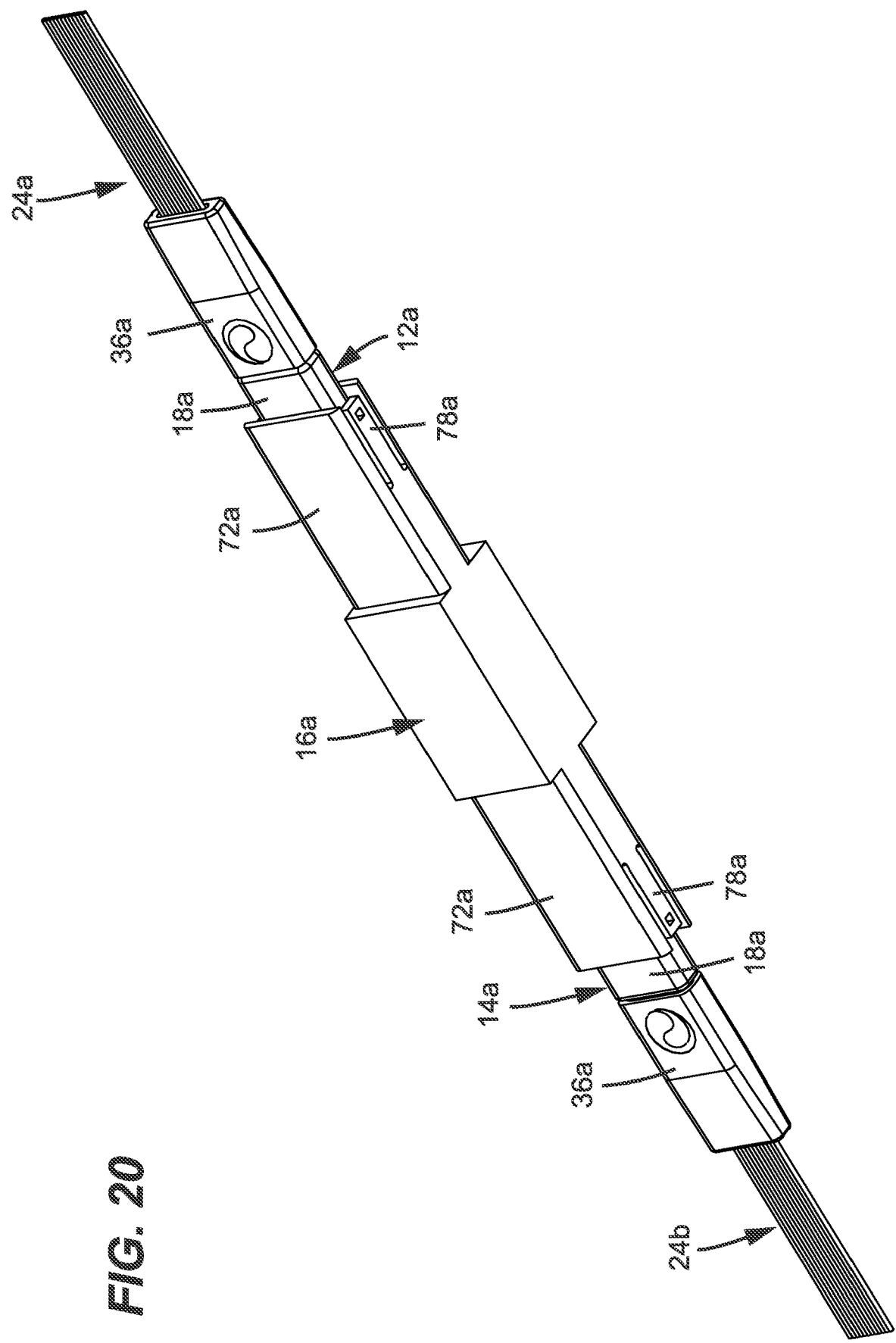
FIG. 20 illustrates a bottom perspective view of the bare-fiber connection system of FIG. 19.
Figure 23:
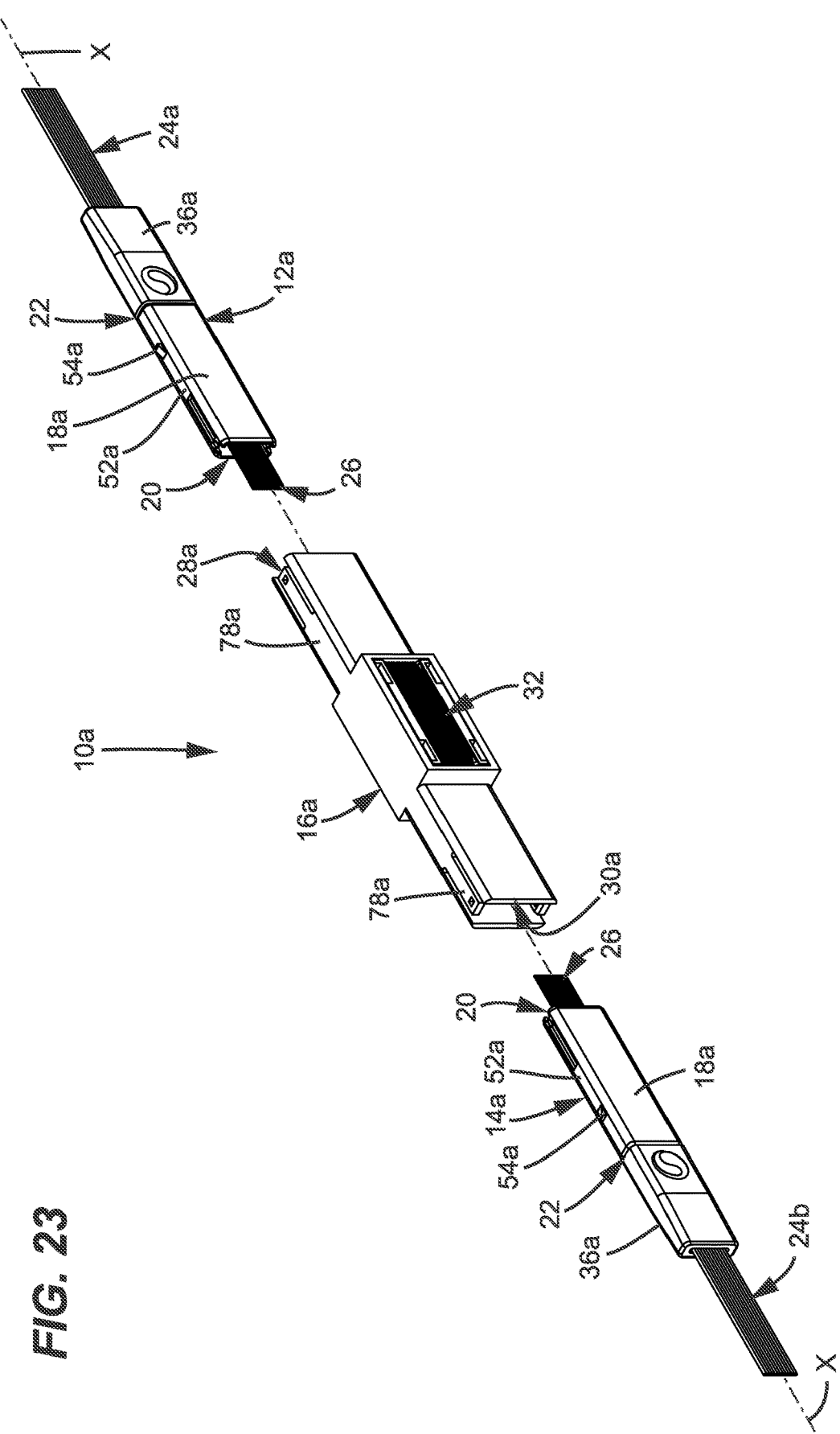
FIG. 23 illustrates a perspective view of the bare-fiber connection system of FIG. 17 with the multi-fiber fiber optic connectors exploded from the multi-fiber adapter.
Figure 24:
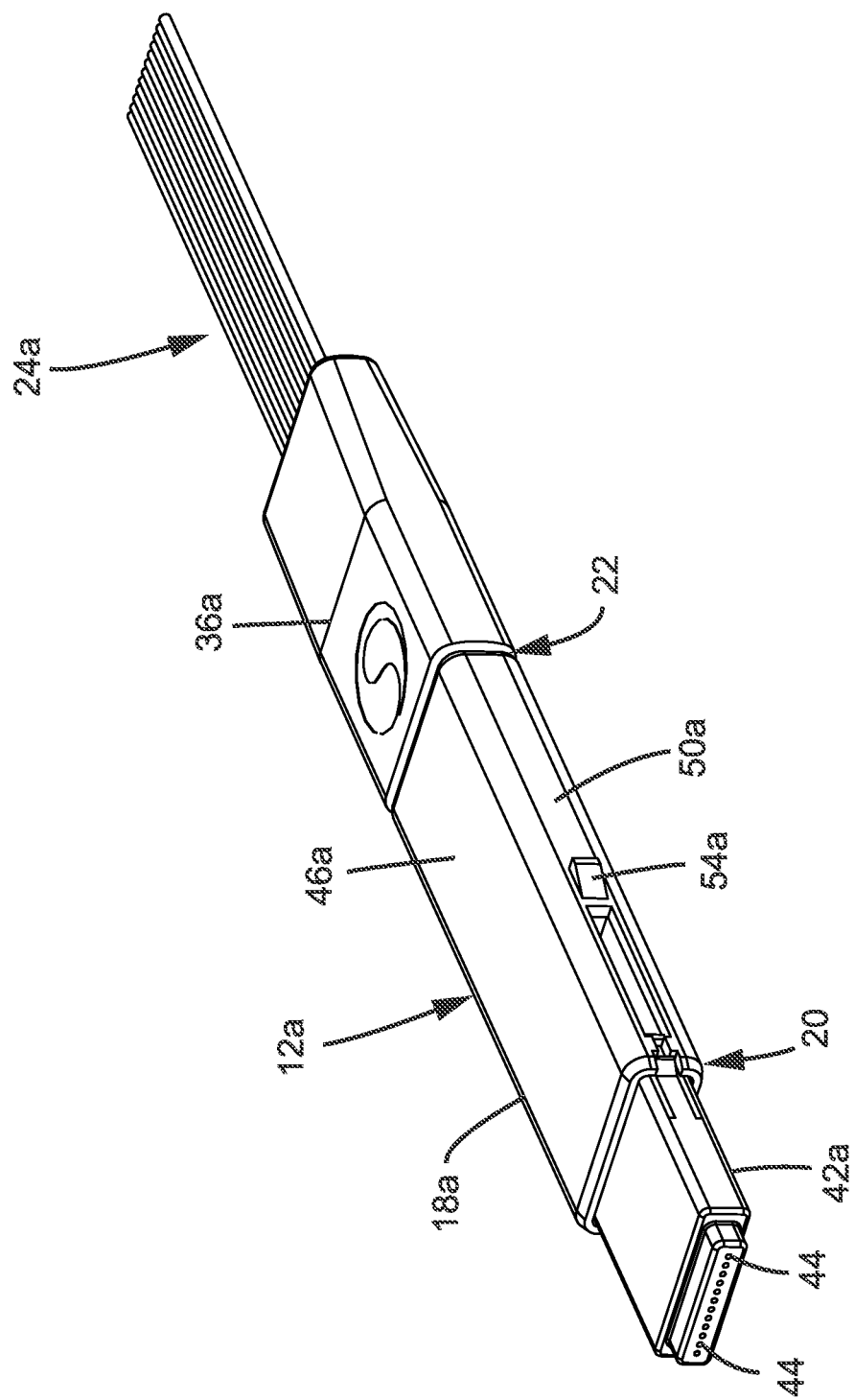
FIG. 24 illustrates a perspective view of one of the multi-fiber fiber optic connectors of FIG. 17.
Figure 25:
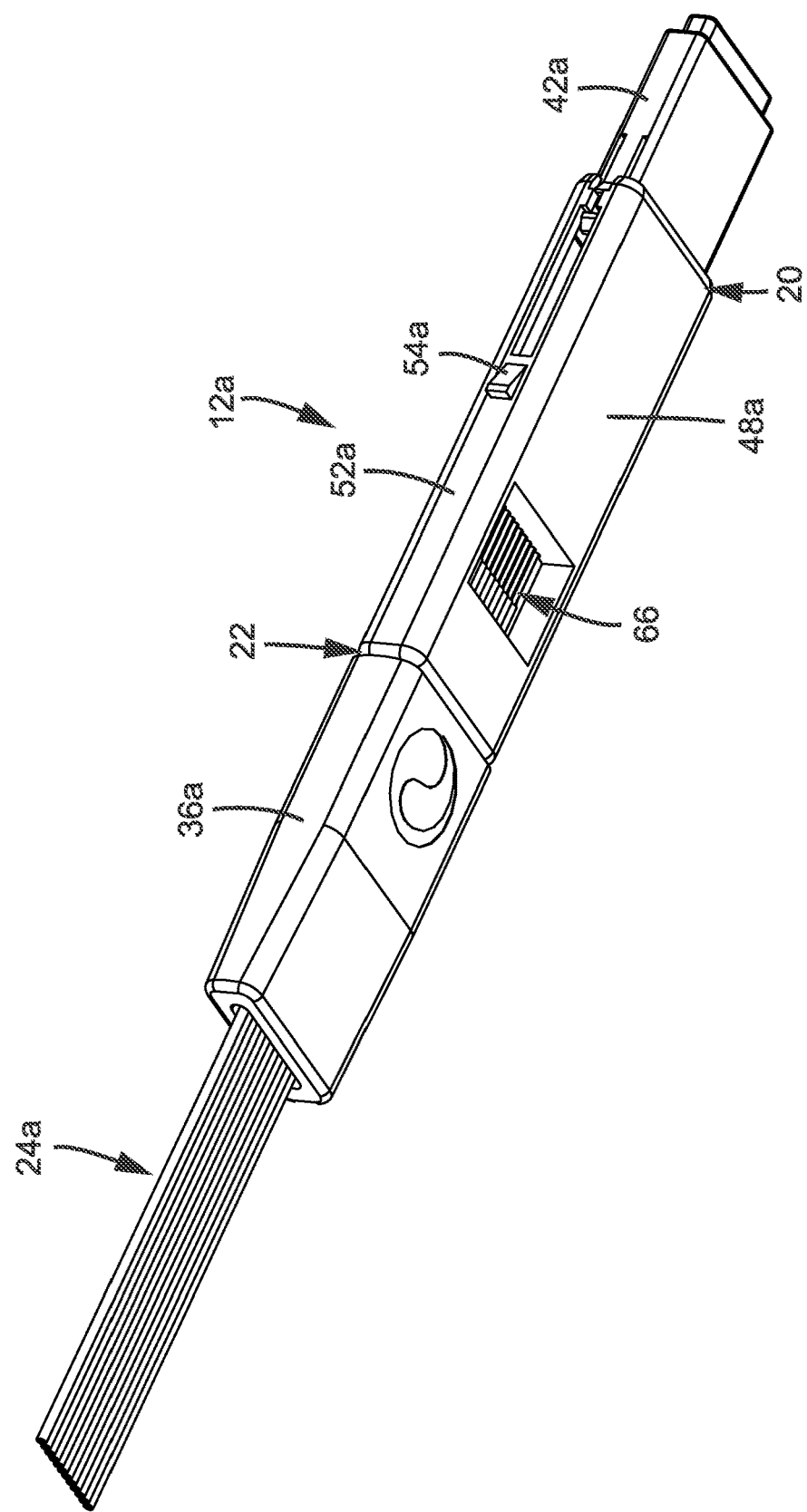
FIG. 25 illustrates a perspective bottom view of the multi-fiber fiber optic connector of FIG. 24.
Figure 28:
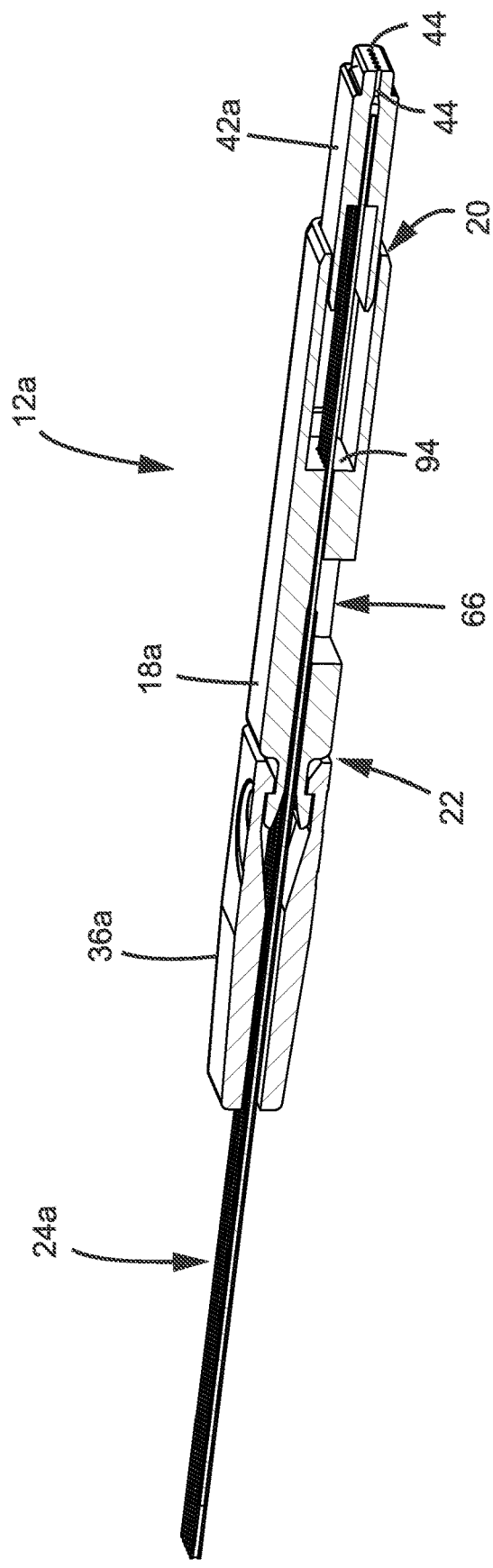
FIG. 28 illustrates a cross-sectional perspective view of the multi-fiber fiber optic connector of FIG. 24.
Figure 29:
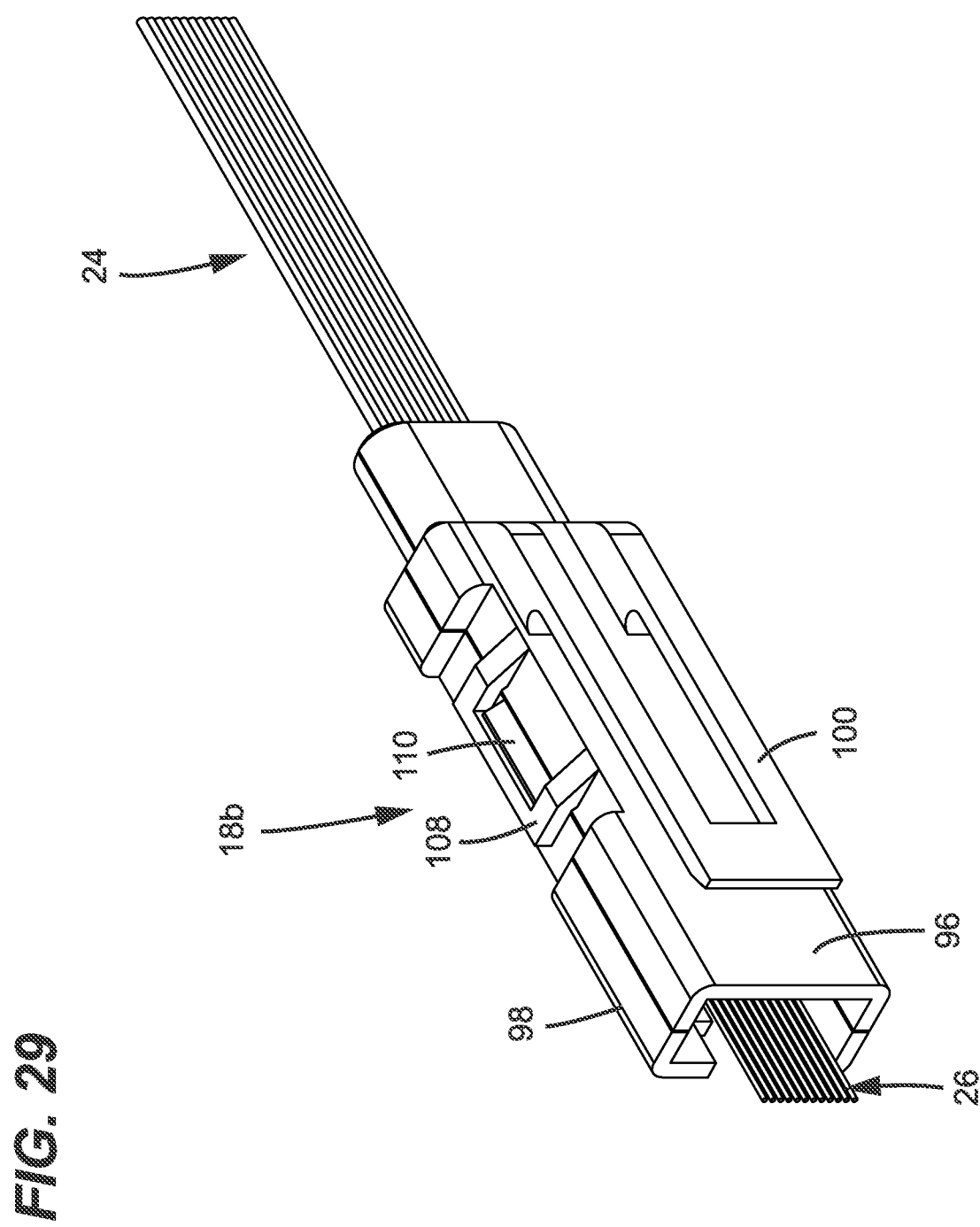
FIG. 29 illustrates a perspective view of an alternative multi-fiber connector including two housing pieces and optical fibers in accordance with the principles of the present disclosure.
Figure 30:
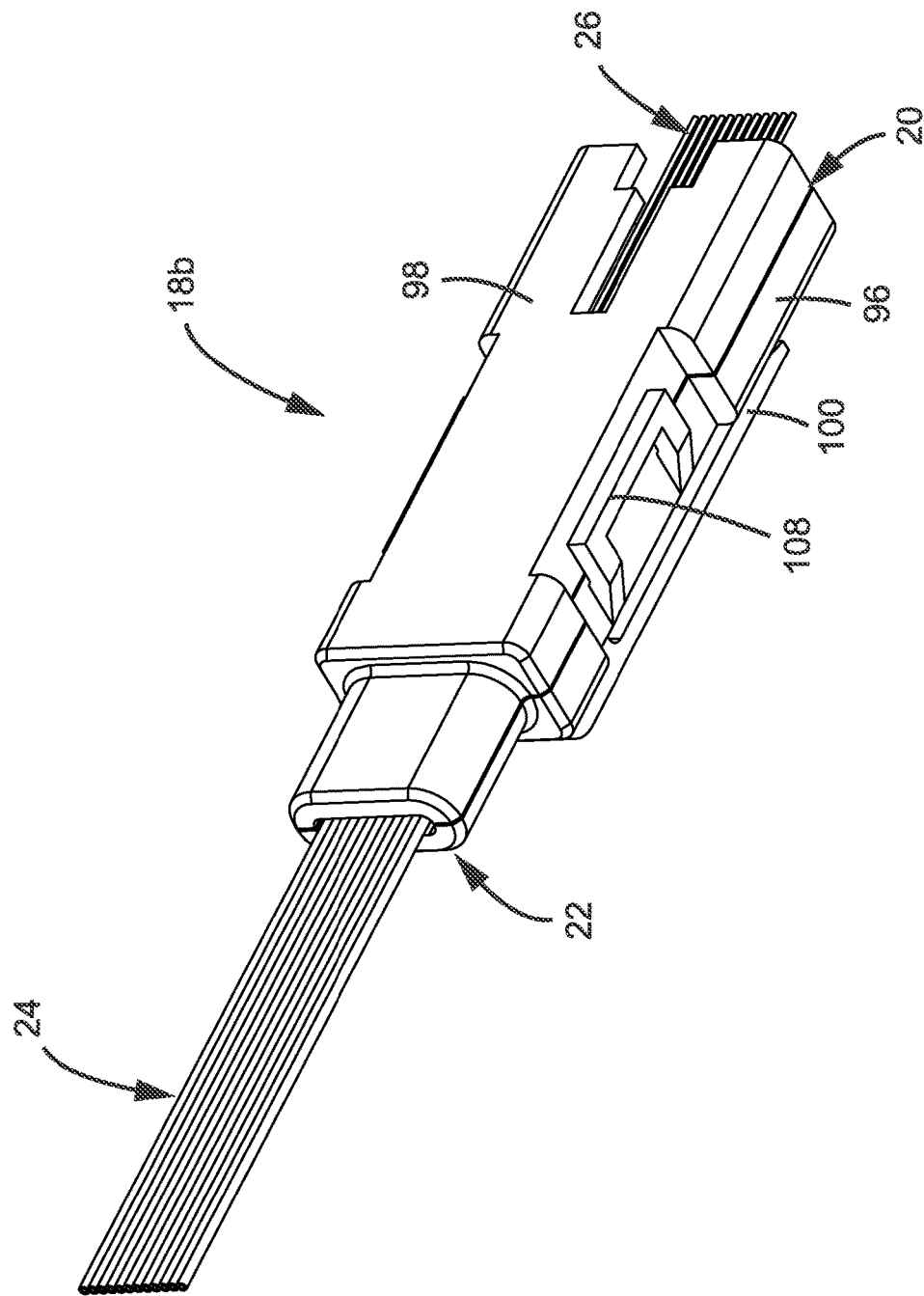
FIG. 30 illustrates a bottom perspective view of the multi-fiber connector of FIG. 29.
Figure 31:
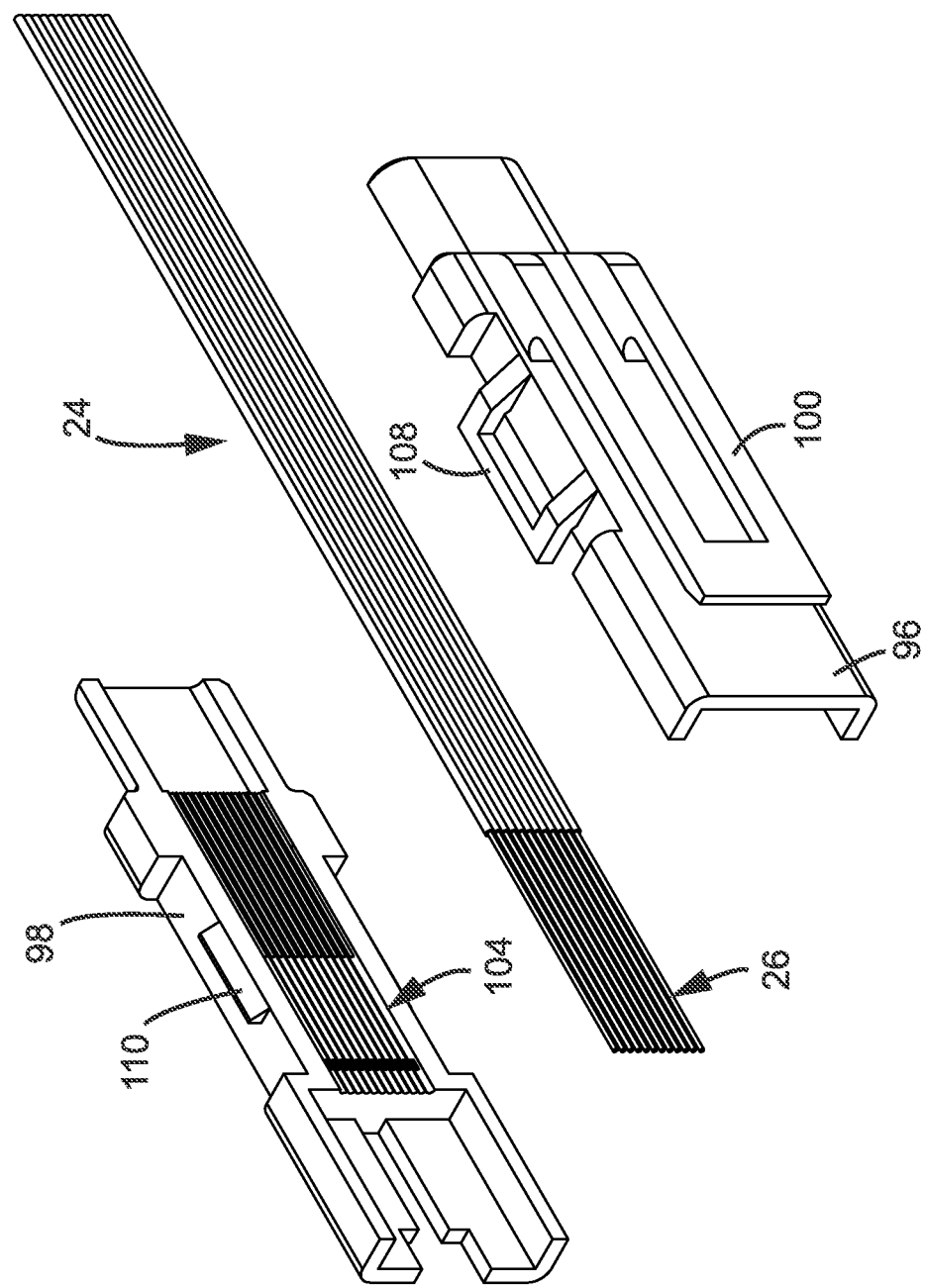
Figure 32:
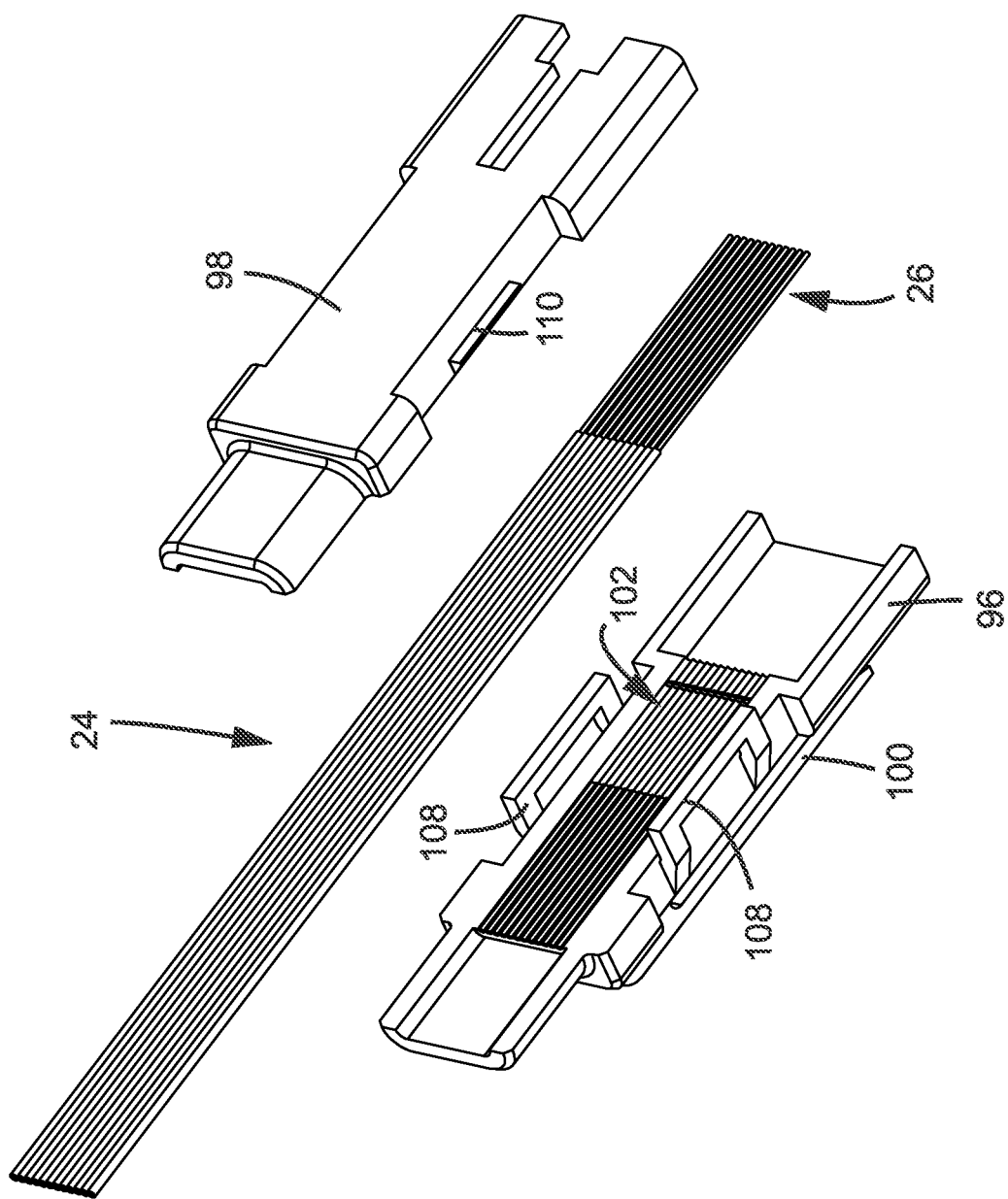
FIG. 32 illustrates another exploded view of the multi-fiber connector of FIG. 29.
Figure 33:
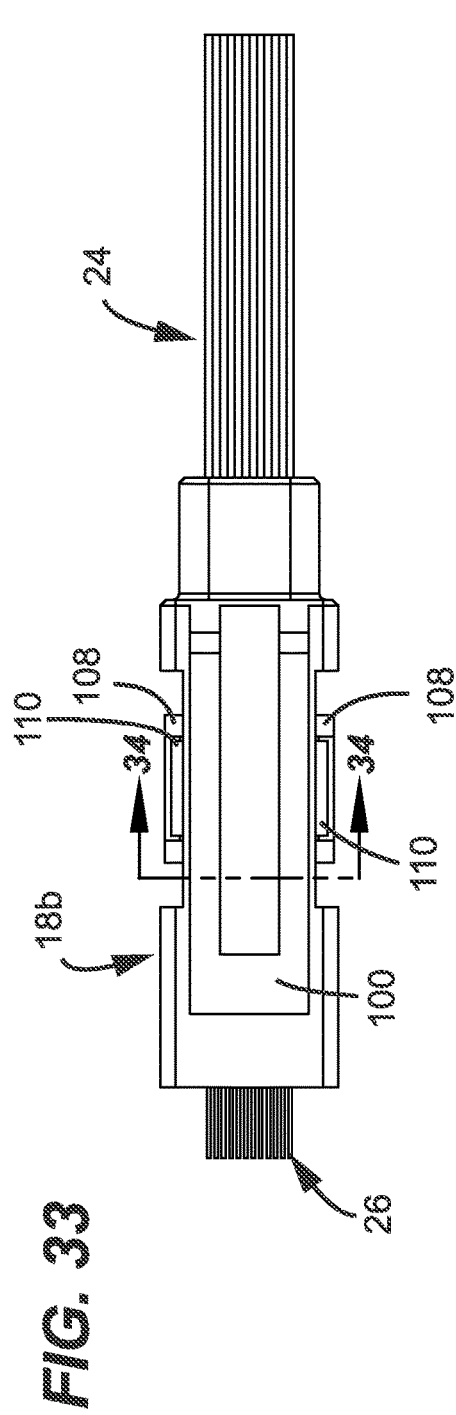
FIG. 33 illustrates a top view of the multi-fiber connector of FIG. 29.

Referring to FIGS. 14-16, the groove-defining piece 32 can define at least a portion of a nose-piece guide 92 for pre-positioning the nose piece 42. As the first and second multi-fiber fiber optic connectors 12, 14 are inserted in respective first and second adapter ports 28, 30 the nose piece 42 will engage the nose-piece guide 92 so that the plurality of fiber passages 44 of the nose piece 42 can align with the multiple fiber alignment grooves 34 of the groove-defining piece 32. It will be appreciated that other types of bare fiber alignment devices may be alternatively used with the multi-fiber adapter 16.

The nose-piece guide 92 can also function to stop the nose piece 42 as the first and second multi-fiber fiber optic connectors 12, 14 are inserted in the first and second adapter ports 28, 30. That is, continued insertion of the first and second multi-fiber fiber optic connectors 12, 14 into the first and second adapter ports 28, 30, respectively, as shown in FIG. 15, causes the nose pieces 42 to engage the groove-defining piece 32 as the latch members 88 are flexed upward by the nose piece releases 86. The nose pieces 42 can be abut the groove-defining piece 32 of the multi-fiber adapter 16.

In certain examples, as the first and second multi-fiber fiber optic connecters 12, 14 are inserted into the first and second adapter ports 28, 30, the nose pieces 42 can retract relative to the connector bodies 18 until the end of the nose pieces 42 bottoms out against an end wall 94 of the connector body 18 (see FIG. 15), although alternatives are possible.

While the front ends of the nose pieces 42 are in contact with the stop of the nose-piece guide of the groove-defining piece 32, the first and second multi-fiber fiber optic connectors 12, 14 can continue to be inserted into the first and second adapter ports 28, 30 causing the connector bodies 18 to move relative to the nose pieces 42 such that the plurality of optical fibers 24a, 24b can slide through the nose pieces 42 and project from the plurality of fiber passages 44 into the multiple fiber alignment grooves 34 (see FIG. 16). The interface between the nose piece 42 and the groove-defining piece 32 can provide pre-alignment of the plurality of optical fibers 24a, 24b before insertion into the multiple fiber alignment grooves 34.

Because there is no release mechanism on either the first and second multi-fiber fiber optic connectors 12, 14 or the multi-fiber adapter 16, a separate tool can be used to release the first and second multi-fiber fiber optic connectors 12, 14 from the first and second adapter ports 28, 30. A special tool can be used to move the latches 78 by flexing the latches 78 outward to disengage the latches 78 from the catch 54 such that the first and second multi-fiber fiber optic connectors 12, 14 can be pulled out of the first and second adapter ports 28, 30. If, for example, the first multi-fiber fiber optic connector 12 is removed from the adapter, the nose piece 42 can be manually pulled back from the retracted to the extended position to provide protection of the optical fibers 24. In other examples, friction between the nose piece 42 and the interior of the multi-fiber adapter 16 (e.g., a friction/interference fit between the nose piece 42 and the nose piece guide 92) can cause the nose piece 42 to automatically move from the retracted position to the extended position as the fiber optic connector 12, 14 is removed from its corresponding adapter port.

In certain examples, portions of the optical fibers 24 may extend beyond the nose piece 42 when the nose piece 42 is in the retracted position. In preferred examples, the portions of the optical fibers 24 that project forwardly beyond the nose piece 42 when the nose piece 42 is retracted are bare fiber portions (e.g., fiber portions with only a core and cladding). In certain examples, the bare fiber portions project at least 3, 4, 5 or 6 millimeters beyond the nose piece 42 when the nose piece 42 is fully retracted, although alternatives are possible.

Referring to FIGS. 17-23, another example bare-fiber connection system 10a is depicted in accordance with the principles of the present disclosure. The bare-fiber connection system 10a is similar to the bare-fiber connection system 10 previously described except the design has a lower profile. That is, the bare-fiber connection system 10a has a lower height construction compared with the bare-fiber connection system 10.

The bare-fiber connection system 10a includes a multi-fiber adapter 16a that functions similar to the multi-fiber adapter 16 described above. However, in order to accommodate the lower profile design of the first and second multi-fiber fiber optic connectors 12a, 14a, the multi-fiber adapter 16a is configured with latches 78a positioned on the first and second minor adapter sides 74a, 76a opposed to being on the first and second major adapter sides 70a, 72a. Also, the catches 54a of the connector bodies 18a are positioned on the first and second minor sides 50a, 52a of the first and second multi-fiber fiber optic connectors 12a, 14a to reduce the overall height and provide a low profile system. The latches 78a are adapted to interface with the catches 54a of the first and second multi-fiber fiber optic connectors 12a, 14a when the first and second multi-fiber fiber optic connectors 12a, 14a are inserted into adapter port openings 28a, 30a. The multi-fiber adapter 16a has low profile or lower height adapter port openings 28a, 30a to correspond with the low profile design of the first and second multi-fiber fiber optic connectors 12a, 14a.

The multi-fiber adapter 16a includes an example groove-defining piece 32a. In certain examples, the groove-defining piece 32a can include multiple stacks of alignment devices, although alternatives are possible. The groove-defining piece 32a defines multiple fiber alignment grooves 34a for receiving and co-axially aligning optical fibers 24a, 24b of the first and second multi-fiber fiber optic connectors 12a, 14a to provide an optical connection therebetween.

Referring to FIGS. 24-28, the first and second multi-fiber fiber optic connectors 12a, 14a can each define a cavity 66 for receiving an adhesive material such as epoxy to bond the optical fibers 24a, 24b within respective connector bodies 18a. In certain examples, the cavity 66 may receive a fiber anchoring chip or other structure that can assist in bonding the optical fibers 24 within respective connector bodies 18a.

The first and second multi-fiber fiber optic connectors 12a, 14a can also include nose pieces 42a that do not have springs for automatically returning the nose pieces 42a to the extended positions. The nose pieces 42a have a low profile and preferably mount at the front end 20 of the connector body 18a of the first and second multi-fiber fiber optic connectors 12a, 14a. The nose pieces 42a define a plurality of fiber passages 44 through which the plurality of optical fibers 24a, 24b extend. The nose pieces 42a can be movable along the longitudinal axis X between an extended position (see FIG. 28) where the fiber ends 26 of the plurality of optical fibers 24a, 24b are protected within the plurality of fiber passages 44 and a retracted position (see FIG. 23) where the fiber ends 26 of the plurality of optical fibers 24a, 24b project forwardly beyond the nose pieces 42a.

Referring to FIGS. 29-32, an alternative connector body 18b is depicted that can be used in the bare-fiber connection systems 10, 10a previously described. The connector body 18b allows an installer to field terminate the optical fibers 24 by clamping the optical fibers 24 between a first housing piece 96 and a second housing piece 98. The connector body 18b provides an installation displacement system that secures the optical fibers 24 in place to prevent stripping of the fibers and allows for further processing such as, cleaving etc. In certain examples, the first and second housings pieces 96, 98 do not require adhesive such as epoxy to anchor the optical fibers in place, but in other examples adhesive may be used as well.

In certain examples, a clip 100 can be provided on the first housing piece 96 to help retain the connector body 18b in a fiber optic adapter. The clip 100 may be a spring-loaded clip.

It will be appreciated that the connector body 18b can be used with the nose pieces 42, 42a previously described. The nose pieces 42, 42a can be mounted to the first and second housing pieces 96, 98. The nose pieces 42, 42b define a plurality of fiber passages 44 through which the plurality of optical fibers 24 extend.

Figure 34:
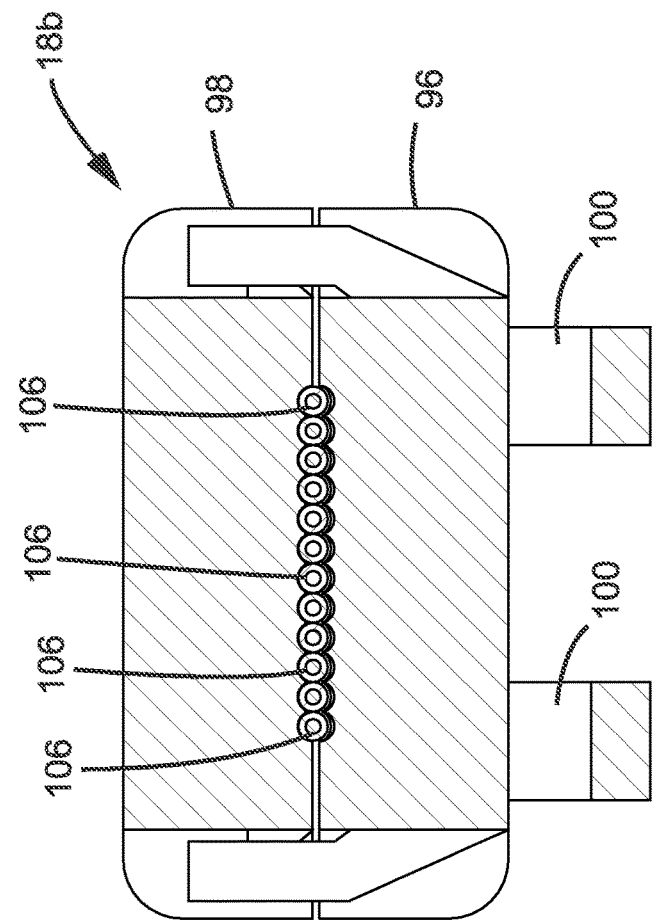
FIG. 34 illustrates a cross-sectional view taken along section line 34-34 of FIG. 33.

The first housing piece 96 defines a plurality of first grooves 102 (see FIG. 32) and the second housing piece 98 defines a plurality of second grooves 104 (see FIG. 31) that oppose the plurality of first grooves 102 when the first and second housing pieces 96, 98 are mounted together such that the plurality of first and second grooves 102, 104 cooperate together to define a plurality of fiber channels 106 (see FIG. 34). The first housing piece 96 includes latches 108 on opposing sides thereof that engage catches 110 on opposing sides of the second housing piece 98 to connect the first and second housing pieces 96, 98 together. That is, the first and second housing pieces 96, 98 can be joined together by a snap-fit connection. In other examples, the first and second housing pieces 96, 98 may be pivotally attached together, although alternatives are possible.

Figure 36:
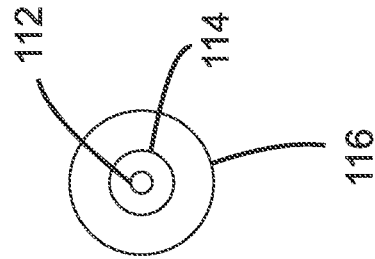
FIG. 36 illustrates a cross-sectional view of a coated fiber portion of the optical fiber of FIG. 29.
Figure 35:
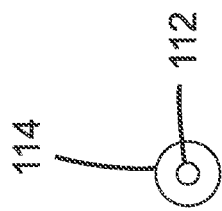
FIG. 35 illustrates a cross-sectional view of a bare fiber portion of the optical fiber of FIG. 29.

Referring to FIGS. 35-36, the optical fibers 24 can include an optical core 112 surrounded by a cladding layer 114. In certain examples, one or more acrylate coating layers 116 may surround the cladding layer 114 within the connector body 18b, but preferably end portions 26 are uncoated. The optical core 112 and the cladding layer 114 can have different indexes of refraction that are selected to cause light to propagate through the optical fiber via total internal reflection.

Optical fibers can include single mode optical fiber and multi-mode optical fibers. Generally, single mode optical fibers have smaller cores than multi-mode optical fibers. For example, a traditional single mode optical fiber has a core with a diameter in the range of 8-10 microns and a cladding layer with an outer diameter in the neighborhood of 125 microns. In contrast, multi-mode optical fibers transitionally have cores with diameters of about 50 microns or about 62.5 microns, and cladding layers with outer diameters of about 125 microns. The acrylate coating layer 116 is typically 200-260 microns in outer diameter. Aspects of the present disclosure are applicable to both single mode and multi-mode optical fibers.

Figure 38:
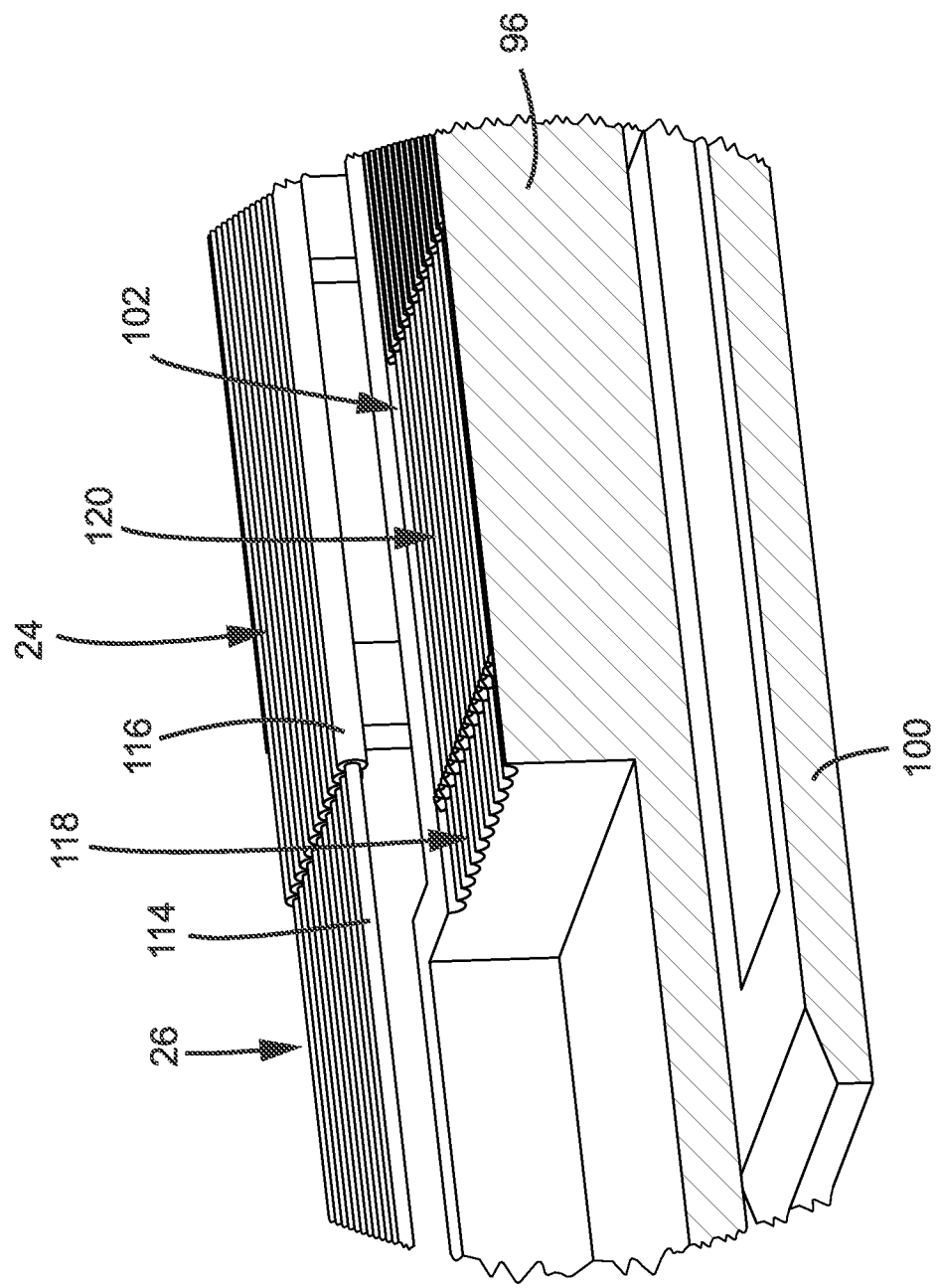
FIG. 38 illustrates an enlarged partial view of FIG. 37.

Turning to FIGS. 37-38, the optical fibers 24 are positioned prior to being inserted within the plurality of first grooves 102 of the first housing piece 96. The plurality of first grooves 102 include a first groove section 118 sized and shaped to support the cladding layer 114 of the optical fibers 24 and a second groove section 120 sized and shaped to support the acrylate coating layer 116 of the optical fibers 24. When the first and second housing pieces 96, 98 are connected together, the optical fibers 24 can be anchored within the connector body 18b by a clamping action.

Figure 39:
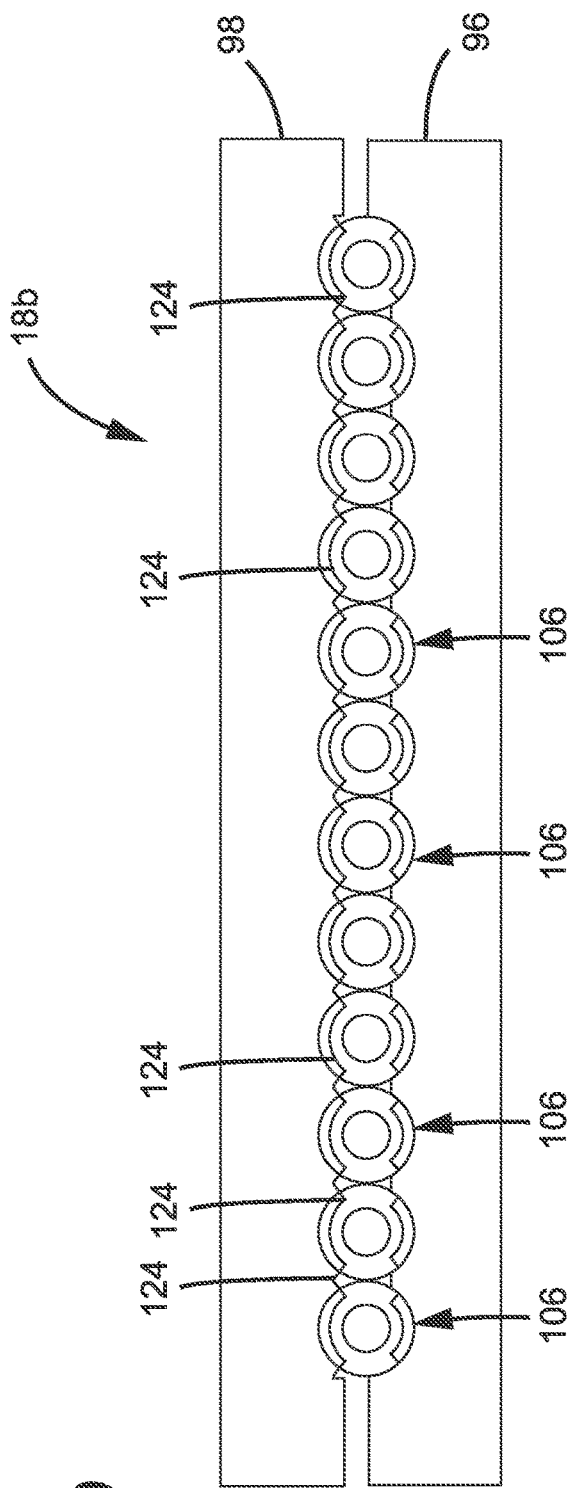
FIGS. 39-40 illustrate schematic cross-sectional views of the multi-fiber connector showing the optical fibers clamped between the two housing pieces.
Figure 40:
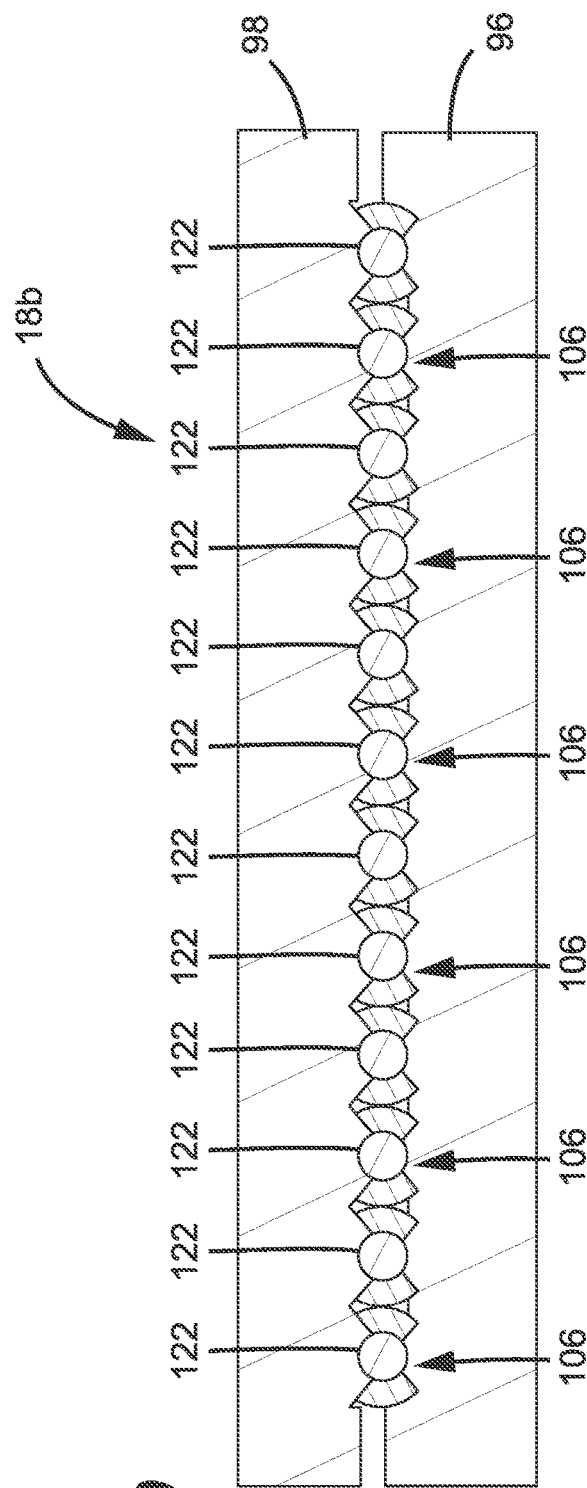

Referring to FIGS. 39-40, the first and second housing pieces 96, 98 are shown connected together with the optical fibers 24 clamped therebetween. The plurality of fiber channels 106 include a first set of teeth 122 and a second set of teeth 124. The first set of teeth 122 and the second set of teeth 124 can have different sizes. In certain examples, the first set of teeth 122 are larger than the second set of teeth 124.

When the first and second housing pieces 96, 98 are mated together to clamp the optical fibers 24 therebetween, the first set of teeth 122 can penetrate the coating layers 116 of the optical fibers 24 and engage the cladding layers 114 of the optical fibers 24 to axially fix the optical fibers 24.

When the first and second housing pieces 100, 102 are mated together to clamp the optical fibers 96 therebetween, the second set of teeth 124 can embed in the coating layers 118 of the optical fibers 96 but do not engage the cladding layers 116 of the optical fibers 96. The second set of teeth 124 can hold the acrylate coating layer 118 with enough force such that the acrylate coating layer 118 can be held tight to the glass core 114 and not strip off under axial load. In certain examples, the first set of teeth 122 axially fix the glass portions of the optical fibers 96 relative to the housing pieces 100, 102, while the second set of teeth 124 provide additional clamping force for axially fixing the fiber coatings relative to the housing pieces 100, 102 and/or the glass portions of the optical fibers 96.

From the forgoing detailed description, it will be evident that modifications and variations can be made without departing from the spirit and scope of the disclosure.

What is claimed is:
1. A bare-fiber connection system comprising:
first and second multi-fiber fiber optic connectors each including:

a connector body without a spring, the connector body having a front end and a rear end, the connector body defining a longitudinal axis that extends through the connector body in an orientation that extends from the front end to the rear end of the connector body;

a plurality of optical fibers extending through the connector body from the rear end to the front end, the plurality of optical fibers each having a fiber end accessible at the front end of the connector body; and a nose piece mounted at the front end of each connector body of the first and second multi-fiber fiber optic connectors, wherein the nose pieces define a plurality of fiber passages through which the plurality of optical fibers extend, the nose pieces being movable along the longitudinal axis between an extended position where the fiber ends of the plurality of optical fibers are protected within the plurality of fiber passages and a retracted position where the fiber ends of the plurality of optical fibers project forwardly beyond the nose pieces; and a multi-fiber adapter defining first and second adapter ports for respectively receiving the first and second multi-fiber fiber optic connectors to couple the first and second multi-fiber fiber optic connectors together, the multi-fiber adapter including a groove-defining piece that defines a plurality of fiber alignment grooves for receiving and co-axially aligning the fiber ends of the plurality of optical fibers such that optical signals can be conveyed between the plurality of optical fibers of the first and second multi-fiber fiber optic connectors;

wherein the groove-defining piece of the multi-fiber adapter defines at least a portion of a nose-piece guide for pre-positioning the nose pieces when the first and second multi-fiber fiber optic connectors are respectively inserted into the first and second adapter ports such that the plurality of fiber passages of the nose pieces align with the plurality of fiber alignment grooves, and wherein the nose-piece guide functions to stop the nose pieces as the first and second multi-fiber fiber optic connectors are inserted into the first and second adapter ports, wherein continued insertion of the first and second multi-fiber fiber optic connectors causes the connector bodies to respectively move relative to the nose pieces causing retraction of the nose pieces relative to the connector bodies such that the fiber ends of the plurality of optical fibers project from the plurality of fiber passages of the nose pieces, respectively, into the plurality of fiber alignment grooves of the groove-defining piece.

2. The bare-fiber connection system of claim 1, wherein each connector body has first and second major sides and first and second minor sides, wherein each connector body has at least one catch positioned on at least one of the major sides and at least one guide rail positioned on at least one of the minor sides, wherein the multi-fiber adapter has at least one latch positioned thereon, the latch of the multi-fiber adapter being configured to engage the catch of the connector body when the first and second multi-fiber fiber optic connectors are respectively installed in the first and second adapter ports of the multi-fiber adapter.

3. The bare-fiber connection system of claim 1, further comprising a fiber anchoring chip that mounts within the connector bodies, the fiber anchoring chip defining a plurality of grooves for receiving the plurality of optical fibers, the plurality of optical fibers being anchored within the plurality of grooves by epoxy.

4. A bare-fiber connection system comprising:

first and second multi-fiber fiber optic connectors each including:
 a connector body, the connector body having a front end and a rear end, the connector body defining a longitudinal axis that extends through the connector body in an orientation that extends from the front end to the rear end of the connector body;
 a plurality of optical fibers extending through the connector body from the rear end to the front end, the plurality of optical fibers each having a fiber end accessible at the front end of the connector body; and
 a nose piece mounted at the front end of each connector body of the first and second multi-fiber fiber optic connectors, wherein the nose pieces define a plurality of fiber passages through which the plurality of optical fibers extend, the nose pieces being movable along the longitudinal axis between an extended position where the fiber ends of the plurality of optical fibers are protected within the plurality of fiber passages and a retracted position where the fiber ends of the plurality of optical fibers project forwardly beyond the nose pieces; and a multi-fiber adapter defining first and second adapter ports for respectively receiving the first and second multi-fiber fiber optic connectors to couple the first and second multi-fiber fiber optic connectors together, the multi-fiber adapter including:

a groove-defining piece that defines a plurality of fiber alignment grooves for receiving and co-axially aligning the fiber ends of the plurality of optical fibers such that optical signals can be conveyed between the plurality of optical fibers of the first and second multi-fiber fiber optic connectors; and a nose-piece guide that functions to stop the nose pieces as the first and second multi-fiber fiber optic connectors are inserted into the first and second adapter ports, wherein continued insertion of the first and second multi-fiber fiber optic connectors causes the connector bodies to respectively move relative to the nose pieces causing retraction of the nose pieces relative to the connector bodies such that the fiber ends of the plurality of optical fibers project from the plurality of fiber passages of the nose pieces, respectively, into the plurality of fiber alignment grooves of the groove-defining piece.

5. The bare-fiber connection system of claim 4, wherein the nose piece guide guides the nose pieces to abut the groove-defining piece.

6. The bare-fiber connection system of claim 4, wherein the nose-piece guide has a friction/interference fit with the nose pieces.

7. The bare-fiber connection system of claim 4, wherein each nose piece has a projection defining the plurality of fiber passages, wherein the projection projects forwardly from a first stop surface, wherein the projection is received by a pocket within the nose-piece guide, and wherein the first stop surface contacts a second stop surface of the multi-fiber adapter when the nose piece is fully inserted into the nose-piece guide.

8. The bare-fiber connection system of claim 7, wherein the pocket is defined at least partially by the groove-defining piece.

9. The bare-fiber connection system of claim 4, wherein the plurality of optical fibers are bare fibers.

10. The bare-fiber connection system of claim 4, wherein the groove-defining piece of the multi-fiber adapter defines at least a portion of a nose-piece guide.

\* \* \* \* \*